(12) United States Patent
Miura

(10) Patent No.: US 12,374,705 B2
(45) Date of Patent: Jul. 29, 2025

(54) FUEL CELL STACK

(71) Applicant: NISSAN MOTOR CO., LTD., Yokohama (JP)

(72) Inventor: Yohei Miura, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 228 days.

(21) Appl. No.: 17/631,608

(22) PCT Filed: May 15, 2020

(86) PCT No.: PCT/JP2020/019531
§ 371 (c)(1),
(2) Date: Jan. 31, 2022

(87) PCT Pub. No.: WO2021/229814
PCT Pub. Date: Nov. 18, 2021

(65) Prior Publication Data
US 2023/0057533 A1  Feb. 23, 2023

(51) Int. Cl.
| H01M 8/04007 | (2016.01) |
| H01M 8/0258 | (2016.01) |
| H01M 8/0267 | (2016.01) |
| H01M 8/0637 | (2016.01) |
| H01M 8/2484 | (2016.01) |

(52) U.S. Cl.
CPC ..... *H01M 8/04067* (2013.01); *H01M 8/0258* (2013.01); *H01M 8/0267* (2013.01); *H01M 8/0637* (2013.01); *H01M 8/2484* (2016.02)

(58) Field of Classification Search
None
See application file for complete search history.

(56) References Cited

U.S. PATENT DOCUMENTS

| 5,795,665 A * | 8/1998 | Allen | H01M 8/0206 |
| | | | 429/468 |
| 2004/0151975 A1 | 8/2004 | Allen | |
| 2007/0298299 A1* | 12/2007 | Izawa | H01M 8/04089 |
| | | | 429/434 |

FOREIGN PATENT DOCUMENTS

| EP | 2 061 113 A1 | 5/2009 | |
| EP | 3 261 160 A1 | 12/2017 | |
| JP | H01-100867 A | 4/1989 | |
| JP | 2008-311112 A | 12/2008 | |
| WO | WO-2004/006356 A2 | 1/2004 | |
| WO | WO-2008123968 A1 * | 10/2008 | ............... C01B 3/38 |

* cited by examiner

*Primary Examiner* — Robert S Carrico
(74) *Attorney, Agent, or Firm* — Foley & Lardner LLP

(57) ABSTRACT

Provided is a fuel cell stack that includes a plurality of fuel cells, the fuel cells stacking an anode electrode layer, a cathode electrode layer, and a solid electrolyte layer sandwiched between the anode electrode layer and the cathode electrode layer, the plurality of fuel cells being stacked having a separator disposed therebetween. The fuel cell stack includes a fuel channel through which fuel passes, the fuel channel formed between adjacent two of the fuel cells by the separator; and a U-turn channel configured to connect the fuel channel to the anode electrode layer. The fuel channel is formed extending in a stacking surface direction of the fuel cells, and the fuel channel includes heat balance adjusting means configured to adjust heat balance of the fuel cells. The U-turn channel is formed to bend from one end of the fuel channel to the anode electrode layer.

17 Claims, 18 Drawing Sheets

FUEL CELL STACK

TECHNICAL FIELD

The present invention relates to a fuel cell stack.

BACKGROUND ART

In a fuel cell stack configured by stacking a plurality of fuel cells, a center portion of the stack increases in temperature since adjacent fuel cells warm each other. On the other hand, the temperature decreases at parts closer to the upper ends and lower ends of the stack, since heat is easily lost externally. If the temperature distribution is non-uniform in a stacking direction of the fuel cell in the fuel cell stack as such, output performance of the fuel cell may decrease.

JP2008-311112A discloses a fuel cell stack configured by alternately stacking a plurality of fuel cells and separators. This fuel cell stack provides a radiator at the center portion of the stack, and the temperature at the center portion of the stack is made closer to the temperatures at both ends of the stack by a heat releasing effect of the radiator.

SUMMARY OF INVENTION

The fuel cell stack described in Patent Document 1 provides a radiator separately to the stack, thus causing an increase in size of the entire device.

The present invention is accomplished in view of the above problem, and an object thereof is to provide a fuel cell structure that makes a temperature distribution of the fuel cell stack uniform without increasing the size of the device.

According to an aspect of this invention, there is provided a fuel cell stack that includes a plurality of fuel cells, the fuel cells stacking an anode electrode layer, a cathode electrode layer, and a solid electrolyte layer sandwiched between the anode electrode layer and the cathode electrode layer, the plurality of fuel cells being stacked having a separator disposed therebetween. The fuel cell stack includes a fuel channel through which fuel passes, the fuel channel formed between adjacent two of the fuel cells by the separator; and a U-turn channel configured to connect the fuel channel to the anode electrode layer. The fuel channel is formed extending in a stacking surface direction of the fuel cells, and the fuel channel includes heat balance adjusting means configured to adjust heat balance of the fuel cells. The U-turn channel is formed to bend from one end of the fuel channel to the anode electrode layer.

DESCRIPTION OF EMBODIMENTS

Embodiments of the present invention will be described below with reference to the drawings.

First Embodiment

Figure 1:
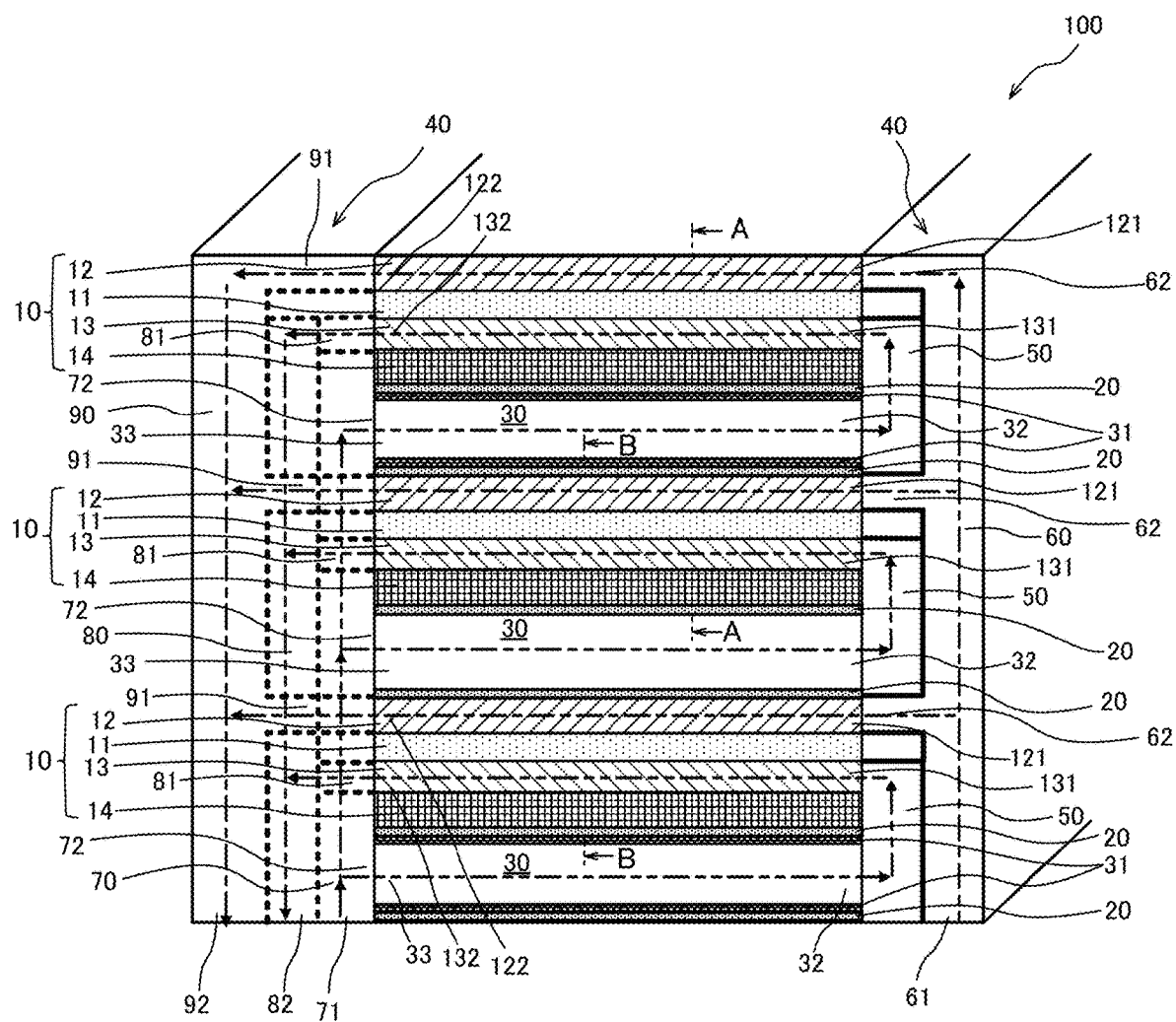
FIG. 1 is a schematic configuration diagram of a fuel cell stack according to a first embodiment of the present invention.

FIG. 1 is a schematic configuration diagram of a fuel cell stack (fuel cell) 100 according to a first embodiment of the present invention.

The fuel cell stack (fuel cell) 100 is, for example, a layer-built cell configured by sequentially stacking (i) a plurality of fuel cells 10 configured as solid oxide fuel cells (SOFC) and (ii) separators 20. In the present embodiment, the fuel cell stack 100 is assumed to be installed on mobile vehicles such as electric vehicles and hybrid vehicles, however the fuel cell stack 100 may also be used as power sources for various electrical equipment, or the like. In FIG. 1, three of the fuel cells 10 are stacked, however the number of fuel cells 10 stacked is not limited to this.

The SOFC fuel cell stack 100 has a high operating temperature of around 600° C. In the SOFC fuel cell stack 100, air is used as cathode gas, and hydrogen or hydrocarbon fuels such as methane ($CH_4$) is used as anode gas. Fuel gas such as anode gas used in the fuel cell stack 100 is selected in response to the fuel cell system built.

As illustrated in FIG. 1, the fuel cell stack 100 includes a plurality of the fuel cells 10, the separators 20 provided between adjacent fuel cells 10, fuel channels 30 formed by the separators 20, and a stack frame 40 that configures the periphery of the fuel cell stack 100. One end of the stack frame 40 provides U-turn channels 50 connecting the fuel channels 30 and the fuel cells 10, and an air supply channel 60 connecting to the fuel cells 10. Moreover, the other end of the stack frame 40 provides a fuel supply channel 70 connecting to the fuel channels 30, and a fuel discharge channel 80 and an air discharge channel 90 connecting to the fuel cells 10.

The fuel cell 10 includes an electrolyte layer 11, a cathode electrode layer 12 disposed on one surface of the electrolyte layer 11, an anode electrode layer 13 disposed on the other surface of the electrolyte layer 11, and a metal support body 14 provided supporting the anode electrode layer 13.

The electrolyte layer (solid electrolyte layer) 11 is a thin film body formed by an oxide having an oxygen ion conduction property, and is sandwiched between the anode electrode layer 13 and the cathode electrode layer 12. For example, yttria-stabilized zirconia (YSZ), scandium-stabilized zirconia (SSZ), samarium-doped ceria (SDC), gadolinium-doped ceria (GDC), lanthanum strontium gallate magnesite (LSGM) or the like may be used as the oxides. When operating the fuel cell stack 100, the fuel cell 10 generates heat due to electrical resistance of the electrolyte layer 11.

The cathode electrode layer 12 is a plate-shaped member formed of lanthanum strontium cobalt composite oxide (LSC), lanthanum strontium cobalt iron oxide (LSCF) or the like, and is provided contacting an upper surface of the electrolyte layer 11. At the cathode electrode layer 12, a reduction reaction occurs, which reduces oxygen in the cathode gas (air). The cathode electrode layer 12 may have a current collector having a current collecting function compacted on a surface opposite the surface contacting the electrolyte layer 11.

The anode electrode layer 13 is a plate-shaped member formed of metal such as nickel (Ni) and oxides such as yttria-stabilized zirconia (YSZ), for example. The anode electrode layer 13 is provided contacting a lower surface of the electrolyte layer 11, and is placed on the metal support body 14. At the anode electrode layer 13, an oxidation reaction occurs, which oxidizes anode gas containing hydrogen or the like by oxide ions conducted through the electrolyte layer 11. The fuel cell 10 generates power on the basis of electrode reactions at the cathode electrode layer 12 and the anode electrode layer 13. The anode electrode layer 13 may have a current collector having a current collecting function compacted on a surface opposite of the surface contacting the electrolyte layer 11, and interpose the current collector between the anode electrode layer 13 and the metal support body 14.

The metal support body 14 is a porous plate-shaped member and is provided supporting the anode electrode layer 13, functioning as a structural member for reinforcing strength of the fuel cell 10. As such, the fuel cell 10 is configured as a so-called metal support fuel cell that stacks the anode electrode layer 13, the electrolyte layer 11 and the cathode electrode layer 12 on the metal support body that serves as a support body. Although it is preferable to provide the metal support body 14 to reinforce the strength of the fuel cell 10, the metal support body 14 is not an essential configuration; the configuration may be one in which the separator 20 described later directly supports the anode electrode layer 13.

The fuel cell stack 100 is configured by stacking the aforementioned fuel cells 10, and the separator 20 of a plate shape is provided between adjacent fuel cells 10. Material forming the separator 20 is not particularly limited as long as the material is an electrically conductive and heat conductive material; for example, alloys and metal containing iron (Fe) or chromium (Cr) are used, and preferably ferritic stainless steel is used. Ferritic stainless steel include, for example, SUS430, SUS434, ZMG (registered trademark), Crofer (registered trademark) and the like. Moreover, the separator 20 may use electrically conductive ceramics, for example. The separator 20 is a plate-shaped member formed by press molding electrically conductive and heat conductive material described above, and electrically connects to the fuel cells 10. Moreover, the separator 20 is configured to form the fuel channel 30 through which fuel passes, between the adjacent fuel cells 10. As illustrated in FIG. 1, the fuel channels 30 contact the stacked surface of the fuel cells 10 via the separators 20, and are formed extending in the stacked surface direction of the fuel cells 10.

As illustrated in FIG. 1, the fuel channels 30 contacting the fuel cells 10 at the upper edge and lower edge in the stacking direction (hereinafter, referred to as fuel channels 30 at the stack edges) has a reforming catalyst 31 applied thereon. On the other hand, the fuel channels 30 contacting the fuel cell 10 at the center in the stacking direction (hereinafter, referred to as the fuel channels 30 at the stack center) has no reforming catalyst 31 applied thereon. As described later, the reforming catalyst 31 has a function as means for adjusting heat balance of the fuel cells 10.

The stack frame 40 configures a periphery portion of the fuel cell stack 100, and holes respectively configuring the U-turn channel 50 and the air supply channel 60 described later are formed on one end in a plane direction of the fuel cells 10 (hereinafter, referred to as one end of the stack frame 40). The hole configuring the U-turn channel 50 is formed to connect to one end 32 of the fuel channel 30 and one end 131 of the anode electrode layer 13. The hole configuring the air supply channel 60 is formed to connect to one end 121 of the cathode electrode layer 12. Moreover, the other end in the plane direction of the fuel cells 10 (hereinafter, referred to as other end of the stack frame 40) have holes configuring the fuel supply channel 70, the fuel discharge channel 80, and the air discharge channel 90, respectively. The hole configuring the fuel supply channel 70 is formed to connect to the other end 33 of the fuel channel 30, and the hole configuring the fuel discharge channel 80 is formed to connect to the other end 132 of the anode electrode layer 13. Moreover, the hole configuring the air discharge channel 90 is formed to connect to the other end 122 of the cathode electrode layer 12.

The U-turn channel 50 is provided on the one end of the stack frame 40, and connects the fuel channel 30 to the anode electrode layer 13. The U-turn channel 50 is configured of a hole of the stack frame 40 formed to connect the fuel channel 30 to the anode electrode layer 13, and is formed to bend from the one end 32 of the fuel channel 30 to the one end 131 of the anode electrode layer 13. Fuel (or anode gas) flowing through the fuel channel 30 makes a U-turn by the U-turn channel 50, and is supplied to the anode electrode layer 13. The U-turn channel 50 may be in any shape as long as the fuel (anode gas) can be supplied from the one end 32 of the fuel channel 30 to the one end 131 of the anode electrode layer 13. As such, by providing a structure that supplies the fuel (anode gas) to the anode electrode layer 13 via the U-turn channel 50, the fuel channels 30 may be used as channels for heat balance adjustment that adjust the heat balance of the fuel cells 10, as described later.

The air supply channel 60 is provided on the one end of the stack frame 40, and distributes air to the cathode electrode layer 12 of the fuel cells 10. The air supply channel 60 is configured of a hole of the stack frame 40 formed to connect to one ends 121 of the cathode electrode layers 12. The air supply channel 60 takes in external air from an inlet 61 at a lower end of the stack frame 40, and distributes the air taken in to the cathode electrode layers 12 from cathode electrode layer connecting portions 62.

The fuel supply channel 70 is provided on the other end of the stack frame 40, and distributes the fuel to the fuel channels 30. The fuel supply channel 70 is configured of a hole of the stack frame 40 formed to connect to the other ends 33 of the fuel channels 30. The fuel supply channel 70 introduces the fuel supplied externally of the fuel cell stack 100 from an inlet 71 on the lower end of the stack frame 40, and distributes the introduced fuel from anode electrode layer connecting portions 72 to the fuel channels 30. The fuel supply channel 70 and the air supply channel 60 are provided on opposing ends of the stack frame 40; the air and the fuel hence flow in opposite directions. As described later, reforming reaction occurs within the fuel channels 30 at the fuel channels 30 that dispose the reforming catalyst 31; the reforming reaction easily occurs around the inlet from where the fuel is supplied in the fuel channels 30. Since the reforming reaction is a heat absorbing reaction, if the reforming reaction occurs around the inlet 61 of the air supply channel 60 where a large amount of cold air flows in, the temperature decrease increases locally, which may affect the output of the fuel cell stack 100. Therefore, in the present embodiment, by making the flow of the air and the fuel opposite, a distance is created between a part where the reforming reaction easily occurs and the inlet 61 of the air supply channel 60 where the large amount of cold air flows in.

The fuel discharge channel 80 is provided on the other end of the stack frame 40, and discharges anode off-gas of the fuel cells 10 to externally of the fuel cell stack 100. The fuel discharge channel 80 is configured of a hole of the stack frame 40 formed to connect to the other end 132 of the anode electrode layers 13. The fuel discharge channel 80 introduces the anode off-gas of the anode electrode layers 13 from anode electrode layer connecting portions 81, and discharges the introduced anode off-gas from an outlet 82 on the lower end of the stack frame 40 to externally of the fuel cell stack 100.

The air discharge channel 90 is provided on the other end of the stack frame 40, and discharges cathode off-gas of the fuel cells 10 externally of the fuel cell stack 100. The air discharge channel 90 is configured of a hole of the stack frame 40 formed to connect to the other ends 122 of the cathode electrode layers 12. The air discharge channel 90 introduces the cathode off-gas of the cathode electrode layers 12 from cathode electrode layer connecting portions 91, and discharges the introduced cathode off-gas from an outlet 92 on the lower end of the stack frame 40 to externally of the fuel cell stack 100.

By the above configuration, the air and fuel are supplied to and discharged from the fuel cell stack 100 in the following order. Namely, the air supplied externally of the fuel cell stack 100 to the air supply channel 60 is first distributed to the cathode electrode layers 12. The cathode off-gas discharged from the cathode electrode layers 12 is collected as one by the air discharge channel 90, and is discharged externally of the fuel cell stack 100. On the other hand, the fuel supplied to the fuel supply channel 70 is distributed to the fuel channels 30, and is supplied to the anode electrode layers 13 via the U-turn channels 50. The anode off-gas discharged from the anode electrode layers is collected as one by the fuel discharge channel 80, and is discharged externally of the fuel cell stack 100.

Next describes details of the fuel channels 30.

Figure 2:
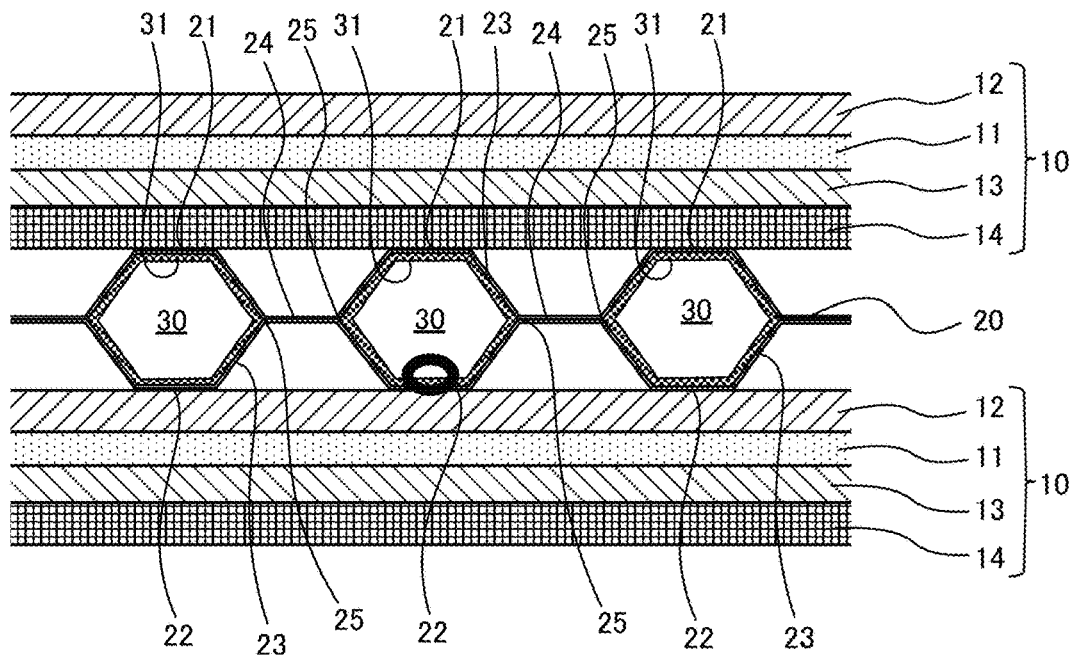
FIG. 2 is a sectional view taken along line A-A in FIG. 1.

FIG. 2 is a sectional view taken along line A-A in FIG. 1, and is a view describing the fuel channels 30 at the stack edges. Moreover, FIG. 3 is a sectional view taken along line B-B in FIG. 1, and is a view describing the fuel channels 30 at the stack center.

Figure 3:
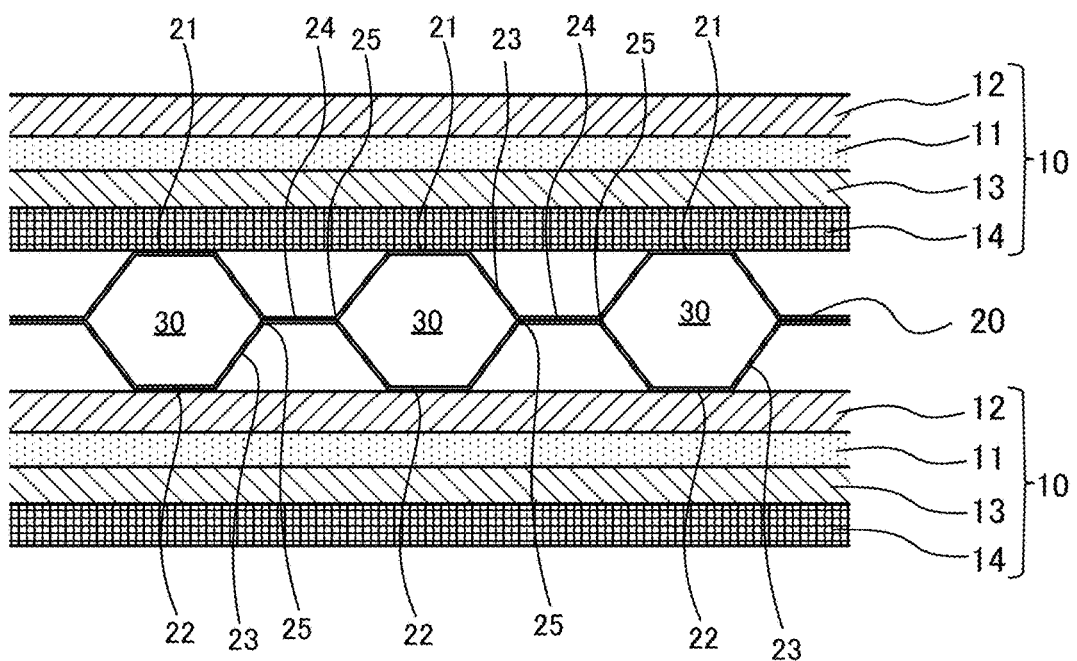
FIG. 3 is a sectional view taken along line B-B in FIG. 1.

As illustrated in FIGS. 2 and 3, the separator 20 includes a first abutting portion 21 that abuts the metal support body 14 (anode electrode layer side) supporting the anode electrode layer 13 of one of the fuel cells 10 of two adjacent fuel cells 10, and a second abutting portion 22 that abuts the cathode electrode layer 12 (cathode electrode layer side) of the other fuel cell 10 of the two adjacent fuel cells 10. Moreover, the separator 20 includes a plurality of first connecting portions 23 that connect the first abutting portion 21 and the second abutting portion 22, and a second connecting portion 24 that connect the first connecting portions 23. The first abutting portion 21 and the second abutting portion 22 are arranged in a width direction of the separator having a certain interval provided therebetween; one end of the first abutting portion 21 is connected to one end of the second abutting portion 22 by their respective first connecting portion 23, and the other end of the first abutting portion 21 is connected to the other end of the second abutting portion 22 by their respective first connecting portion 23. The first connecting portion 23 has a bent portion 25 bent in the stacking direction, in the center (center portion) in the stacking direction of the fuel cell 10, which accordingly forms the fuel channels 30 of a hexagonal shape surrounded by the first abutting portion 21, the second abutting portion 22, and the first connecting portions 23, as illustrated in FIGS. 2 and 3. Since the first connecting portion 23 has the bent portion 25 as such, in a case of expansion displacement in the stacking direction of the fuel cells 10, the bend of the bent portion 25 can absorb this displacement. The bent portion 25 of the first connecting portion 23 that connects one ends of the first abutting portion 21 and the second abutting portion 22 can connect to the bent portion 25 of the first connecting portion 23 that connects the other ends of the first abutting portion 21 and the second abutting portion 22, by the second connecting portion 24.

As illustrated in FIG. 2, the fuel channels 30 at the stack edges have the reforming catalyst 31 applied on the entire inner circumferential surface of the fuel channels 30. Accordingly, when reformed fuel containing methane ($CH_4$) (hydrocarbon fuel) is supplied to the fuel channels 30 at the stack edges from the fuel supply channel 70 at the time of operating the fuel cell stack 100, the hydrocarbon fuel is promoted by the reforming catalyst 31 to cause a reforming reaction, to generate anode gas containing hydrogen ($H_2$). The anode gas reformed and generated within the fuel channels 30 is supplied to the anode electrode layers 13 via the U-turn channels 50 from the one end 32 of the fuel channel 30 (see FIG. 1).

Figure 4:
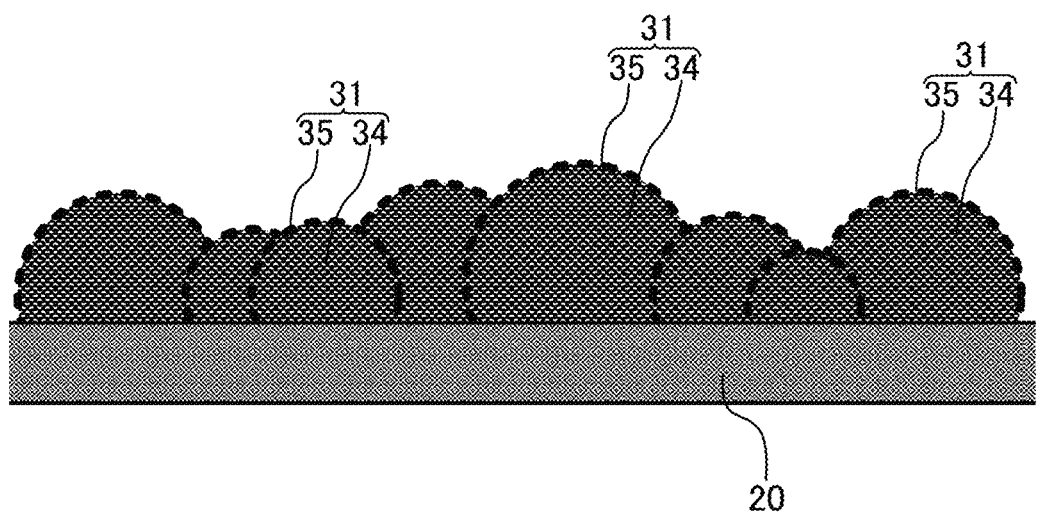
FIG. 4 is a enlarged sectional view of the part circled in FIG. 2, and is a schematic sectional view describing a microstructure of a reforming catalyst.

FIG. 4 is an enlarged sectional view of the part circled in FIG. 2, and is a sectional view describing a microstructure of the reforming catalyst 31.

As illustrated in FIG. 4, the reforming catalyst 31 is configured having a carrier 34 carrying catalyst fine particles 35. As a method for carrying the catalyst fine particles 35, impregnation method or the like may be used for example.

As described above, the reforming catalyst 31 is applied on the entire inner circumferential surface of the fuel channels 30.

Any known catalyst fine particles 35 may be used; for example, any one of nickel (Ni), iron (Fe), manganese (Mn), cobalt (Co), molybdenum (Mo), platinum (Pt), ruthenium (Ru), rhodium (Ph), and iridium (Ir), or a plurality thereof is included.

The carrier 34 is configured of an oxide; any known one may be used; for example, including any one of alumina ($Al_2O_3$), ceria ($CeO_2$), zirconia ($ZrO_2$), and ceria-zirconia solid solution. By making the carrier 34 carry the catalyst fine particles 35, the agglomerating/coarsing of the catalyst fine particles 35 is prevented. Moreover, by the carrier 34 configured of an oxide, precipitation of carbon from the fuel is held down. Moreover, the carrier 34 has a certain degree of thermal insulation function.

As described above, the reforming catalyst 31 is disposed (applied) in the fuel channels 30 at the stack edges. On the other hand, as illustrated in FIG. 3, the fuel channels 30 at the stack center has no reforming catalyst 31 applied within the fuel channels 30. Therefore, even if the fuel passes through the fuel channels 30 at the stack center, the fuel will remain unreformed within the fuel channels, and the unreformed hydrocarbon fuel is supplied to the anode electrode layer 13 via the U-turn channel 50. The fuel supplied to the anode electrode layer 13 is reformed within the anode electrode layer 13. Preferably, the reforming catalyst 31 is dropped inside the anode electrode layer 13 of the fuel cell 10 at the center in the stacking direction. This promotes the reforming within the anode electrode layer 13.

Figure 5:
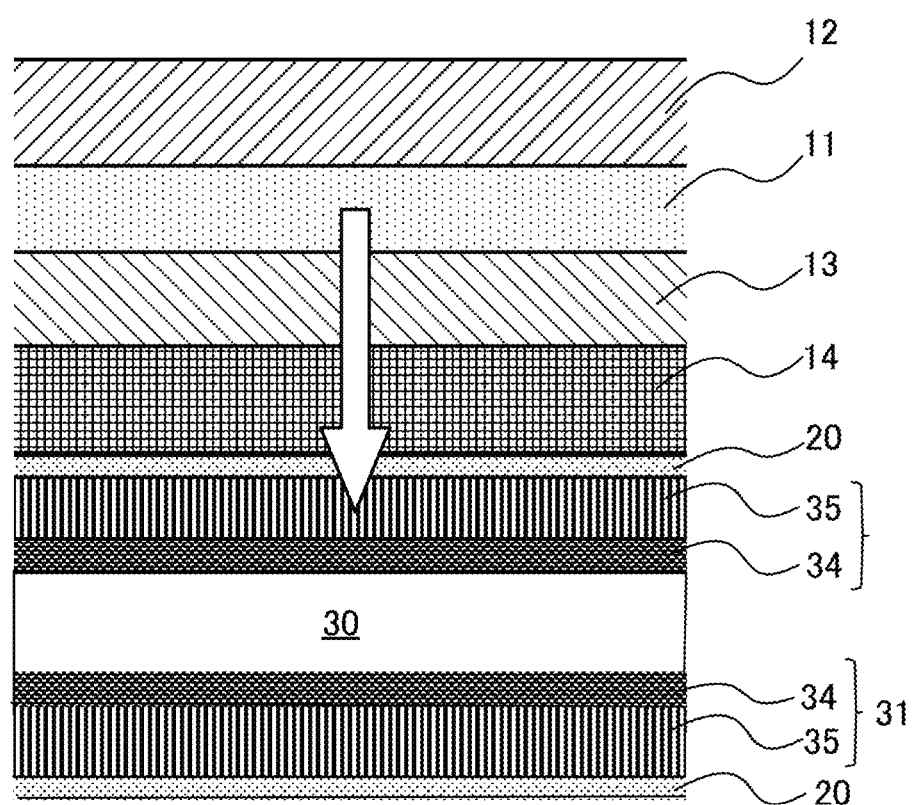
FIG. 5 is a view describing heat balance of a fuel cell at stack edges.
Figure 6:
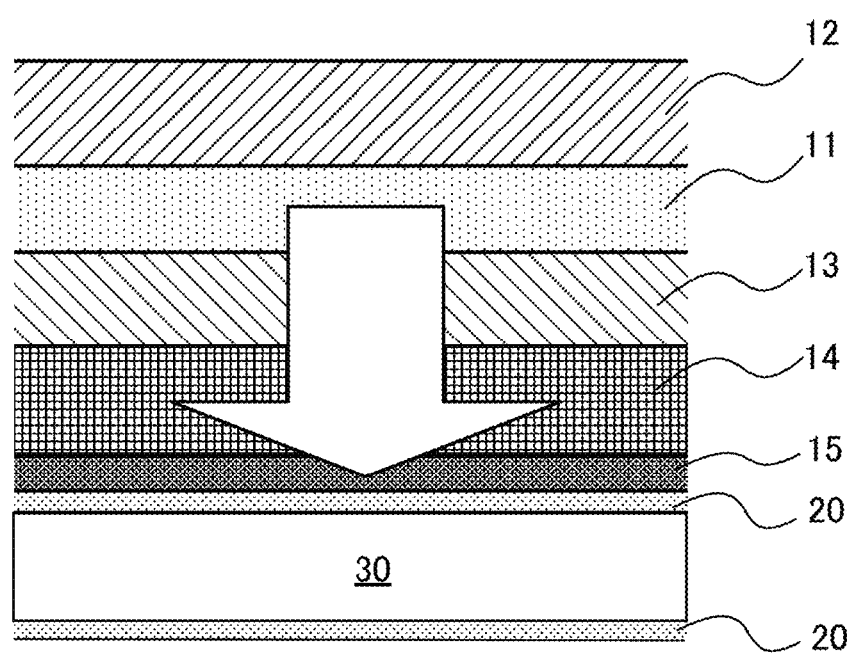
FIG. 6 is a view describing heat balance of a fuel cell at a stack center.

Next describes the heat balance of the fuel cells 10, with reference to FIGS. 5 and 6.

FIG. 5 is a view describing the heat balance of the fuel cells 10 at the upper edge and lower edge in the stacking direction (stack edges). FIG. 5 illustrates a section in the stacking direction of the fuel cells 10 at the stack edges and the fuel channels 30 at the stack edges, and the arrow in the drawing illustrates transfer of heat in the fuel cells 10 at the stack edges. Moreover, FIG. 6 is a view describing the heat balance of the fuel cell 10 at the center in the stacking direction (stack center). FIG. 6 illustrates a section in the stacking direction of the fuel cell 10 at the stack center and the fuel channels 30 at the stack center, and the arrow in the drawing illustrates transfer of heat in the fuel cell 10 at the stack center.

In the fuel cell stack 100 configured by stacking a plurality of the fuel cells 10, normally, at the stack center, the temperature increases since adjacent fuel cells 10 warm each other. On the other hand, the temperature decreases at parts closer to the stack edges, since heat is easily lost externally. If the temperature distribution is non-uniform in the stacking direction of the fuel cells 10 in the fuel cell stack 100 as such, output performance of the fuel cell may decrease. In response to this, a radiator or the like may be provided at the center portion of the fuel cell stack 100, to make the temperature at the stack center closer to the temperature of stack edges by the heat releasing effect of the radiator; however, providing a radiator separately to the stack would increase the size of the entire device. On the other hand, in the present embodiment, the fuel (anode gas) is supplied to the fuel cells 10 (anode electrode layers 13) from one ends 32 of the fuel channels 30 via the U-turn channels 50; it is hence possible to adjust the heat balance of the fuel cells 10 in the fuel channels 30. Namely, in a case of directly supplying the fuel (or anode gas) from the fuel channels 30 to the anode electrode layers 13, it is difficult to adjust the heat balance of the fuel cells 10 in the fuel channels 30; in the present embodiment however, it is possible to use the fuel channels 30 as channels for heat balance adjustment, since the present embodiment includes the U-turn channels 50. More specifically, as described below, by disposing the reforming catalyst 31 within the fuel channels 30 at the stack edges, the heat balance of the fuel cells 10 is adjusted between the stack center and both edges. Therefore, it is possible to prevent the non-uniform temperature distribution in the stacking direction of the fuel cells 10, without increasing the size of the entire device.

As illustrated in FIGS. 5 and 6, heat generates due to the electrical resistance in accordance with magnitude of the electric current, at the electrolyte layer 11 of the fuel cell 10. The heat due to the heat generation of the electrolyte layer 11 transfers to the anode electrode layer 13.

As illustrated in FIG. 5, the reforming catalyst 31 is disposed within the fuel channels 30 at the stack edges, and hence the fuel is reformed within the fuel channels 30. Here, the reforming reaction is a heat absorbing reaction, however since the carrier 34 of the reforming catalyst 31 has a thermal insulation function as described above, the heat absorption caused by the reforming reaction (heat absorbing reaction) of the heat of the fuel cells 10 (anode electrode layer 13) within the fuel channels 30 is held down.

On the other hand, as illustrated in FIG. 6, the fuel channels 30 at the stack center dispose no reforming catalyst 31. Moreover, a catalyst layer 15 is formed within the anode electrode layer 13 by the reforming catalyst 31 dropped on the anode electrode layer 13, in the fuel cell 10 at the stack center. Therefore, the fuel passed through the fuel channels 30 at the stack center is supplied to the anode electrode layer 13 via the U-turn channel 50 unreformed, and is reformed at the anode electrode layer 13. Accordingly, in the fuel cell 10 at the stack center, the heat caused by the heat generation of the electrolyte layer 11 is absorbed by the reforming reaction (heat absorbing reaction) in the anode electrolyte layer 13. By the heat absorption by the reforming reaction within the anode electrode layer 13, the fuel cell 10 at the stack center is cooled.

As described above, at the stack edges (the fuel cells 10 and the fuel channels 30 at the stack edges), the reforming reaction (heat absorbing reaction) occurs mainly within the fuel channels 30 by the reforming catalyst 31, and since the carrier 34 of the reforming catalyst 31 has a thermal insulation function, the fuel cells 10 are difficult to cool. On the other hand, at the stack center (the fuel cell 10 and the fuel channels 30 at the stack center), the reforming reaction (heat absorbing reaction) occurs mainly within the anode electrode layer 13 since no reforming catalyst 31 is disposed within the fuel channels 30, and the fuel cell 10 is easily cooled. Therefore, the temperature increase at the stack center and the temperature decrease at the stack edges are held down, and the non-uniform temperature distribution in the stacking direction of the fuel cell 10 is prevented. As such, in the present embodiment, the heat balance of the fuel cells 10 is adjusted by whether or not to dispose the reforming catalyst 31 within the fuel channels 30. Namely, the reforming catalyst 31 functions as heat balance adjusting means for adjusting the heat balance of the fuel cells 10.

Although there also is a case in which a portion of the fuel is supplied to the anode electrode layer 13 via the U-turn channel 50 unreformed, within the fuel channels 30 at the stack edges, in this case also, the reforming reaction within the fuel channels 30 will be dominant as a whole; therefore the non-uniform temperature distribution will be prevented.

Figure 7:
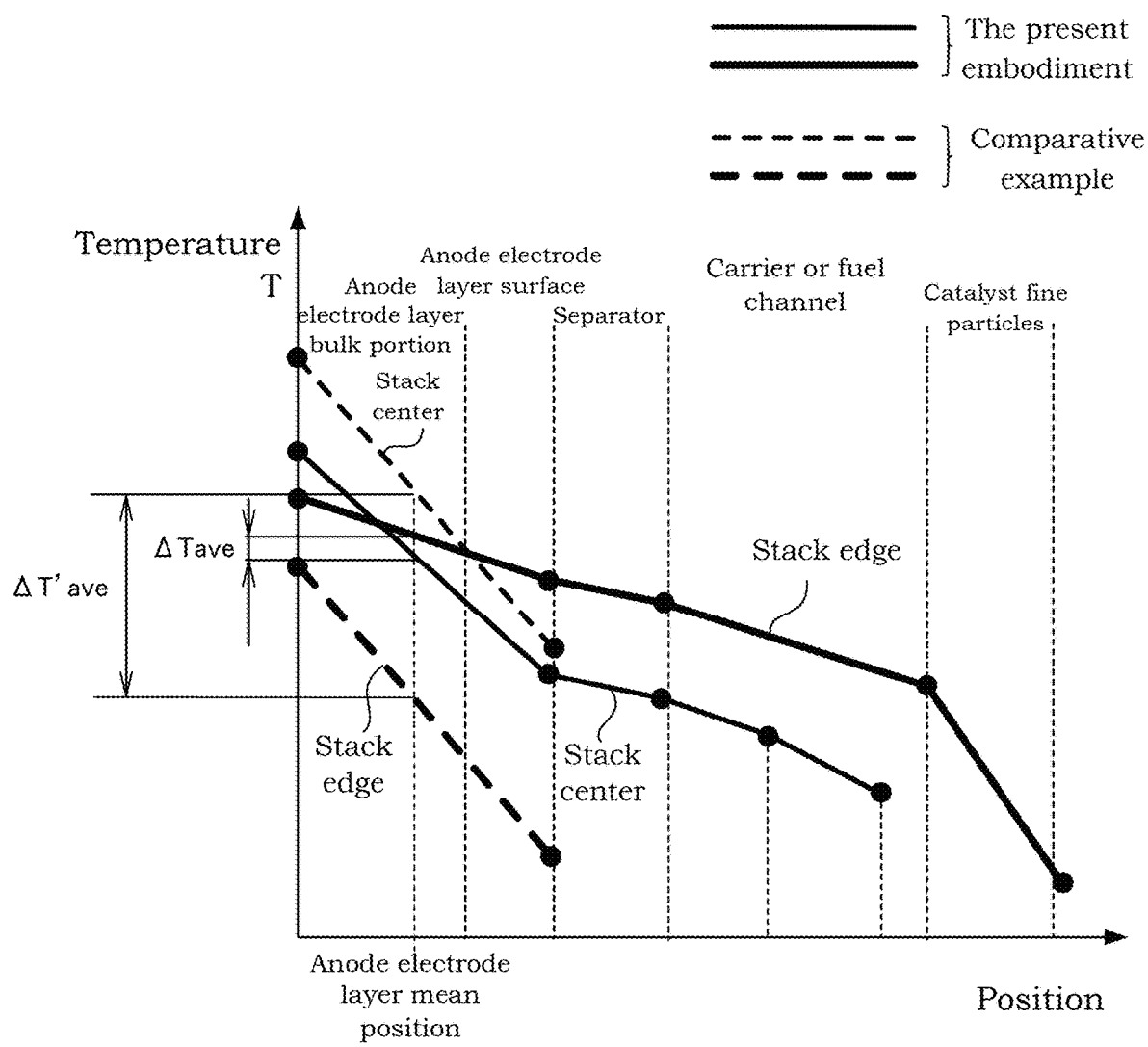
FIG. 7 is a graph illustrating temperatures of a fuel cell at the stack edges and the stack center.

FIG. 7 is a graph illustrating temperatures of the fuel cells 10 at the stack edges and the stack center. FIG. 7 compares the temperature of the fuel cells 10 in a case in which no reforming catalyst 31 is disposed in the fuel channels 30 at the stack edges (comparative example), with the temperature of the fuel cells 10 according to the present embodiment.

In the case in which no reforming catalyst 31 is disposed in the fuel channels 30 at the stack edges (comparative example), reforming of the fuel is performed within the anode electrode layer 13 for any of the fuel cells 10 at the stack edges and at the stack center. Therefore, the heat of the fuel cells 10 is absorbed similarly by the reforming within the anode electrode layer 13, for any of the fuel cells 10 at both the stack edges and the stack center. Therefore, the non-uniform temperature distribution in the stacking direction of the fuel cells 10 is not prevented, and a large temperature difference occurs between the fuel cells 10 at the stack center and the fuel cells 10 at both edges. The temperature difference in a mean position (center) of the anode electrode layer 13 according to the comparative example is illustrated as ΔT'ave in the graph of FIG. 7.

On the other hand, in the present embodiment disposing the reforming catalyst 31 in the fuel channels 30 at the stack edges, the temperature decrease caused by the reforming reaction in the fuel cells 10 at the stack edges is held down, and the temperature difference between the fuel cell 10 at the stack center and the fuel cells 10 at the stack edges is held down low as compared to the comparative example. An average of the temperature difference in the mean position (center) of the anode electrode layer 13 according to the present embodiment is illustrated as ΔTave in the graph of FIG. 7. Upon comparison of ΔTave and ΔT'ave, the non-uniform temperature distribution in the stacking direction of the fuel cells 10 is apparently prevented in the present embodiment.

According to the fuel cell stack 100 of the aforementioned first embodiment, the following effects are achievable.

According to the fuel cell stack 100, the fuel channels 30 are formed between two adjacent fuel cells 10, and one ends 131 of the fuel channels 30 and the anode electrode layers 13 are connected by the U-turn channels 50. Furthermore, the fuel channels 30 include the reforming catalyst 31 (heat balance adjusting means) that adjusts the heat balance of the fuel cells 10. By including the U-turn channels 50 as such, the fuel (anode gas) can be supplied from the fuel channels 30 to the fuel cells 10 via the U-turn channels 50. Therefore, the fuel channels 30 including the reforming catalyst 31 (heat balance adjusting means) may be used as channels for adjusting the heat balance of the fuel cells 10. As such, since it is possible to adjust the heat balance of the fuel cells 10 in the fuel channels 30, the temperature of the fuel cells 10 can be adjusted without providing a radiator or the like separately to the stack. Therefore, it is possible to prevent the non-uniform temperature distribution in the stacking direction of the fuel cells 10, without increasing the size of the device.

According to the fuel cell stack 100, the reforming catalyst 31 is disposed within the fuel channels 30 contacting the fuel cells 10 at the upper edge and lower edge in the stacking direction (fuel channels 30 at the stack edges). Accordingly, the fuel passing through the fuel channels 30 at the stack edges is reformed mainly within the fuel channels 30. Therefore, in the fuel cells 10 at the stack edges, heat absorption caused by reforming is less as compared to a case in which the fuel is reformed within the anode electrode layer 13, and the fuel cells 10 are difficult to cool. Namely, in the fuel cells 10 at the stack edges, the cooling of the temperature caused by the reforming is less as compared to the fuel cell 10 at the stack center, which thus causes the temperature difference in the fuel cells 10 between the stack edges and the center to become small. As such, the temperature decrease of the fuel cells 10 at the stack edges is held down by disposing the reforming catalyst 31 within the fuel channels 30, without providing a radiator or the like separately to the stack. Therefore, it is possible to prevent the non-uniform temperature distribution of the fuel cells 10 in the stacking direction, without increasing the size of the device.

The present embodiment is described using an example of a case in which three fuel cells 10 are stacked, however the number of fuel cells 10 stacked is not limited to this; for example, four or more fuel cells 10 may be stacked. In that case, the reforming catalyst 31 is disposed just within the fuel channels 30 at the stack edges, and no reforming catalyst 31 is disposed in the other fuel channels 30.

Second Embodiment

The fuel cell stack 100 according to a second embodiment is described, with reference to FIGS. 8 to 11. The present embodiment differs from the first embodiment in a point that the closer the fuel channels 30 contacting the fuel cells 10 is to the edge in the stacking direction (hereinafter, referred to as fuel channels 30 close to the stack edges), the more reforming catalyst 31 is disposed within the fuel channels 30. The same reference signs are denoted to the same components as those of the first embodiment, and the detailed descriptions thereof have been omitted.

Figure 8:
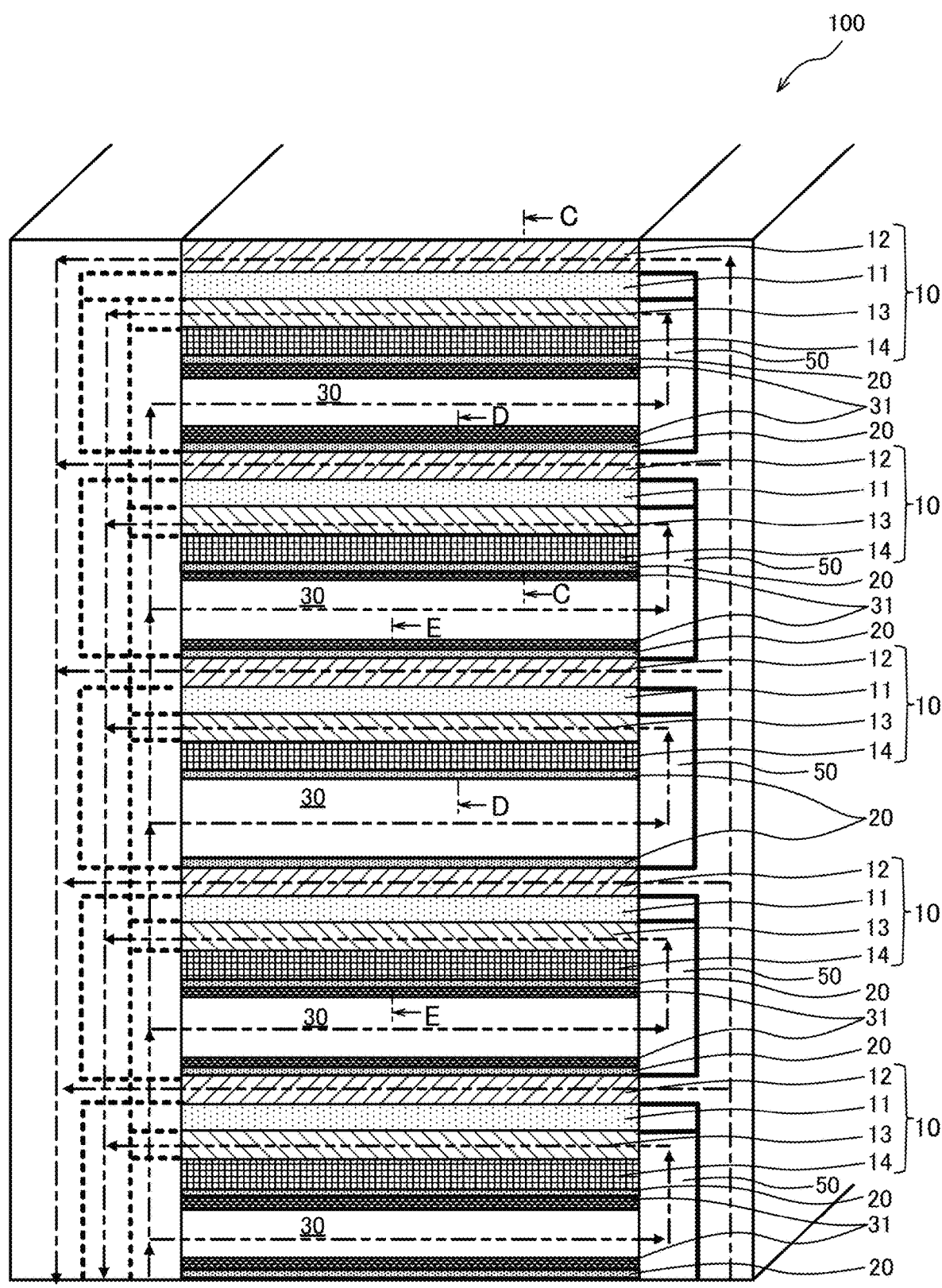
FIG. 8 is a schematic configuration diagram of a fuel cell stack according to a second embodiment.

FIG. 8 is a schematic configuration diagram of the fuel cell stack 100 according to the second embodiment. As with the first embodiment, the fuel cell stack 100 is configured by stacking a plurality (in the present embodiment, five for example) of the fuel cells 10.

As illustrated in FIG. 8, in the present embodiment also, as with the first embodiment, the fuel channels 30 are formed between adjacent fuel cells 10 by the separators 20, and one ends 131 of the fuel channels 30 and the anode electrode layers 13 of the fuel cells 10 are connected by the U-turn channels 50. Moreover, the reforming catalyst 31 is disposed within the fuel channels 30.

Figure 9:
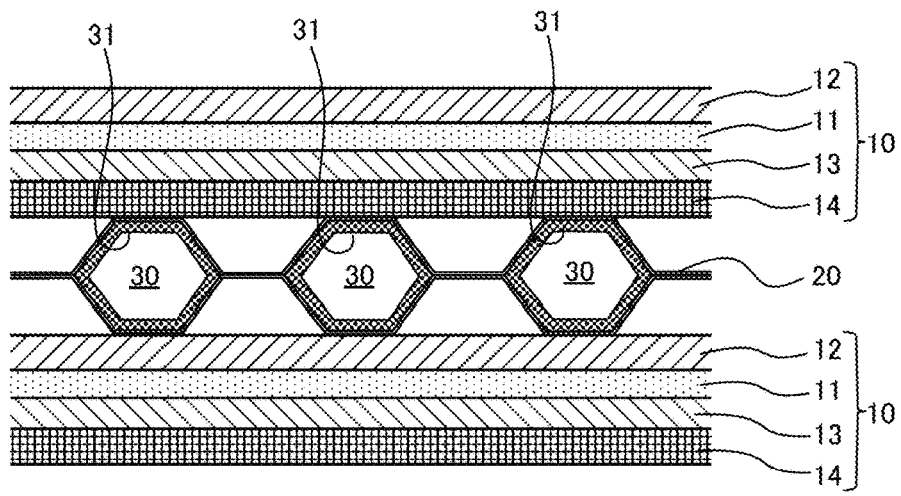
FIG. 9 is a sectional view taken along line C-C in FIG. 8.
Figure 10:
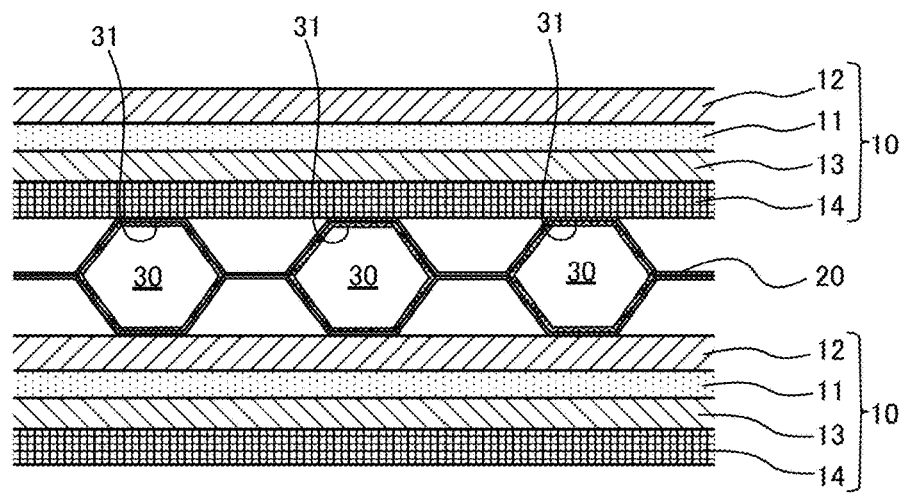
FIG. 10 is a sectional view taken along line D-D in FIG. 8.

FIG. 9 is a sectional view taken along line C-C in FIG. 8, and is a view describing the fuel channels 30 at the stack edges. FIG. 10 is a sectional view taken along line D-D in FIG. 8, and is a view describing the fuel channels 30 between the stack center and the stack edges. Moreover, FIG. 11 is a sectional view taken along line E-E in FIG. 8, and is a view describing the fuel channels 30 at the stack center.

As illustrated in FIG. 9, the reforming catalyst 31 is applied on the entire inner circumference of the fuel channels 30 at the stack edges. Therefore, as with the first embodiment, at the stack edges, the fuel is reformed mainly within the fuel channels 30; the heat absorption caused by reforming is less with respect to the fuel cells 10, and hence the fuel cells 10 are difficult to cool as compared to the case in which the fuel is reformed within the anode electrode layers 13.

Next, as illustrated in FIG. 10, the reforming catalyst 31 is applied on the entire inner circumference of the fuel channels 30 between the stack center and the stack edges. However, the thickness of the reforming catalyst 31 (applied amount) is thinner than the reforming catalyst 31 applied within the fuel channels 30 at the stack edges illustrated in FIG. 9. Namely, the amount of the reforming catalyst 31 disposed in the fuel channels 30 between the stack center and the stack edges is less than the reforming catalyst 31 disposed within the fuel channels 30 at the stack edges. Therefore, in the fuel channels 30 between the stack center and the stack edges, a portion of the fuel is reformed, however a portion of the fuel is supplied to the anode electrode layers 13 via the U-turn channels 50 unreformed, and is reformed within the anode electrode layers 13. Namely, as compared to the stack edges, the amount of fuel supplied to the anode electrode layers 13 unreformed is greater. Therefore, as compared to the stack edges, the fuel reformed within the anode electrode layers 13 increases, and the heat absorption due to the reforming with respect to the fuel cells 10 also increases than the stack edges. Moreover, the thickness of the reforming catalyst 31 is also thinner than the reforming catalyst 31 within the fuel channels 30 at the stack edges; this hence causes the carrier 34 of the reforming catalyst 31 to decrease in the thermal insulation function. Accordingly, between the stack center and the stack edges, the fuel cells 10 easily cool as compared to the stack edges.

Figure 11:
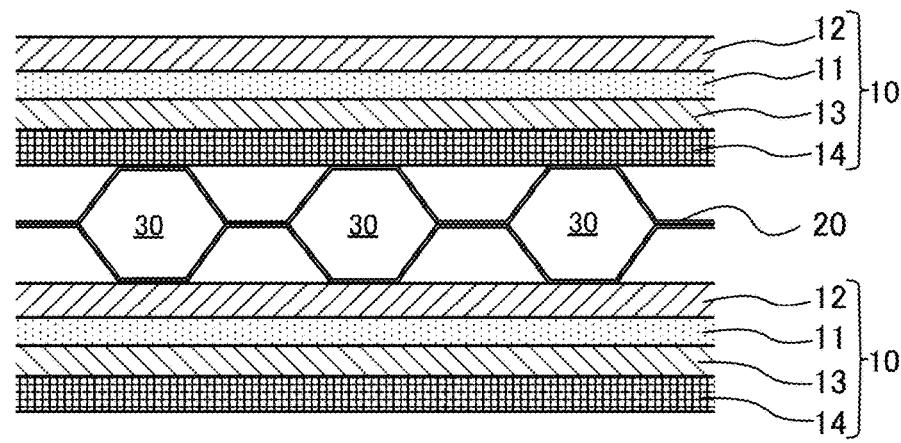
FIG. 11 is a sectional view taken along line E-E in FIG. 8.

On the other hand, as illustrated in FIG. 11, the fuel channels 30 at the stack center disposes no reforming catalyst 31. Therefore, as with the first embodiment, unreformed fuel is supplied from the U-turn channel 50 to the anode electrode layer 13 in the fuel cell 10 at the stack center, and the fuel is reformed mainly within the anode electrode layer 13. Accordingly, in the fuel cell 10 at the stack center, the heat absorption caused by the reforming is further greater than the fuel cells 10 between the stack center and the stack edges, and the fuel cell 10 is further easily cooled.

As described above, the magnitude of heat absorption caused by the reforming reaction with respect to the fuel cells 10 can be adjusted by the amount of the reforming catalyst 31 disposed within the fuel channels 30. Namely, the reforming catalyst 31 functions as heat balance adjusting means for adjusting the heat balance of the fuel cells 10. Furthermore, by disposing more of the reforming catalyst 31 within the fuel channels 30 in the fuel channels 30 closer to the edge in the stacking direction, the amount of heat absorbed due to the reforming reaction is decreased as the fuel cells 10 are closer to the edge in the stacking direction, thus holding down the temperature decrease. Accordingly, the non-uniform temperature distribution of the fuel cells 10 in the stacking direction is prevented.

The present embodiment is described by using an example stacking five fuel cells 10, however the number of the fuel cells 10 stacked can be any number, as long as the fuel channels 30 closer to the edge in the stacking direction has more reforming catalyst 31 disposed within the fuel channels 30.

Moreover, in the present embodiment, no reforming catalyst 31 is disposed within the fuel channels 30 at the stack center, however it is not limited to this; the reforming catalyst 31 may be disposed within the fuel channels 30 at the stack center. However, in this case, the reforming catalyst 31 of an amount (thickness) less than the fuel channels 30 between the stack center and the stack edges is disposed (applied) within the fuel channels 30 of the stack center.

According to the fuel cell stack 100 of the aforementioned second embodiment, the following effects are achievable.

According to the fuel cell stack 100, the fuel channels 30 are formed between two adjacent fuel cells 10, and the one ends 131 of the fuel channels 30 and the anode electrode layers 13 are connected by the U-turn channels 50. Furthermore, the fuel channels 30 include the reforming catalyst 31 (heat balance adjusting means) that adjust the heat balance of the fuel cells 10. As such, by including the U-turn channels 50, the fuel channels 30 disposing the reforming catalyst 31 (heat balance adjusting means) can be used as channels for adjusting the heat balance. Accordingly, since the heat balance of the fuel cells 10 can be adjusted in the fuel channels 30, the temperature of the fuel cells 10 can be adjusted without providing a radiator or the like separately to the stack. Therefore, it is possible to prevent the non-uniform temperature distribution in the stacking direction of the fuel cells 10, without increasing the size of the device.

According to the fuel cell stack 100, more of the reforming catalyst 31 is disposed within the fuel channels 30 at the fuel channels 30 contacting the fuel cells 10 closer to the edges in the stacking direction. Therefore, the closer to the edge in the stacking direction, the reforming reaction occurs more within the fuel channels 30, and the closer to the center in the stacking direction, the reforming reaction occurs more within the anode electrode layers 13 of the fuel cells 10. Accordingly, the heat absorption amount by the reforming reaction decreases as the fuel cells 10 come closer to the edge in the stacking direction, which holds down the temperature decrease, thus preventing the non-uniform temperature distribution in the stacking direction of the fuel cells 10. As such, the temperature distribution of the fuel cells 10 in the stacking direction is adjusted by adjusting the amount of the reforming catalyst 31 disposed in the fuel channels 30, without providing a radiator or the like separately to the stack. Accordingly, it is possible to prevent the non-uniform temperature distribution in the stacking direction of the fuel cells 10, without increasing the size of the device.

In the present embodiment, the heat balance of the fuel cells 10 is adjusted by adjusting the thickness (amount) of the reforming catalyst 31, however the heat balance adjustment of the fuel cells 10 using the reforming catalyst 31 is not limited to this. For example, the heat balance of the fuel cells 10 may be adjusted by the type of the reforming catalyst 31. For example, a reforming catalyst 31 using a carrier 34 having a high thermal conductivity is used for the fuel channels 30 more closer to the stack edges. This promotes the thermal conduction to the catalyst fine particles 35, thus making the reforming reaction within the fuel channels 30 dominant as the fuel cells 10 are closer to the stack edges, and the heat of the fuel cells 10 becomes difficult to be absorbed. Moreover, for example, a reforming catalyst 31 using a carrier 34 having a low porosity is applied on the fuel channels 30 more closer to the stack edges. This enlarges the thermally conductive area to the catalyst fine particles 35 and promotes the thermal conduction, thus making the reforming reaction within the fuel channels 30 dominant as the fuel cells 10 are closer to the stack edges, and the heat of the fuel cell 10 becomes difficult to be absorbed.

Third Embodiment

Figure 12:
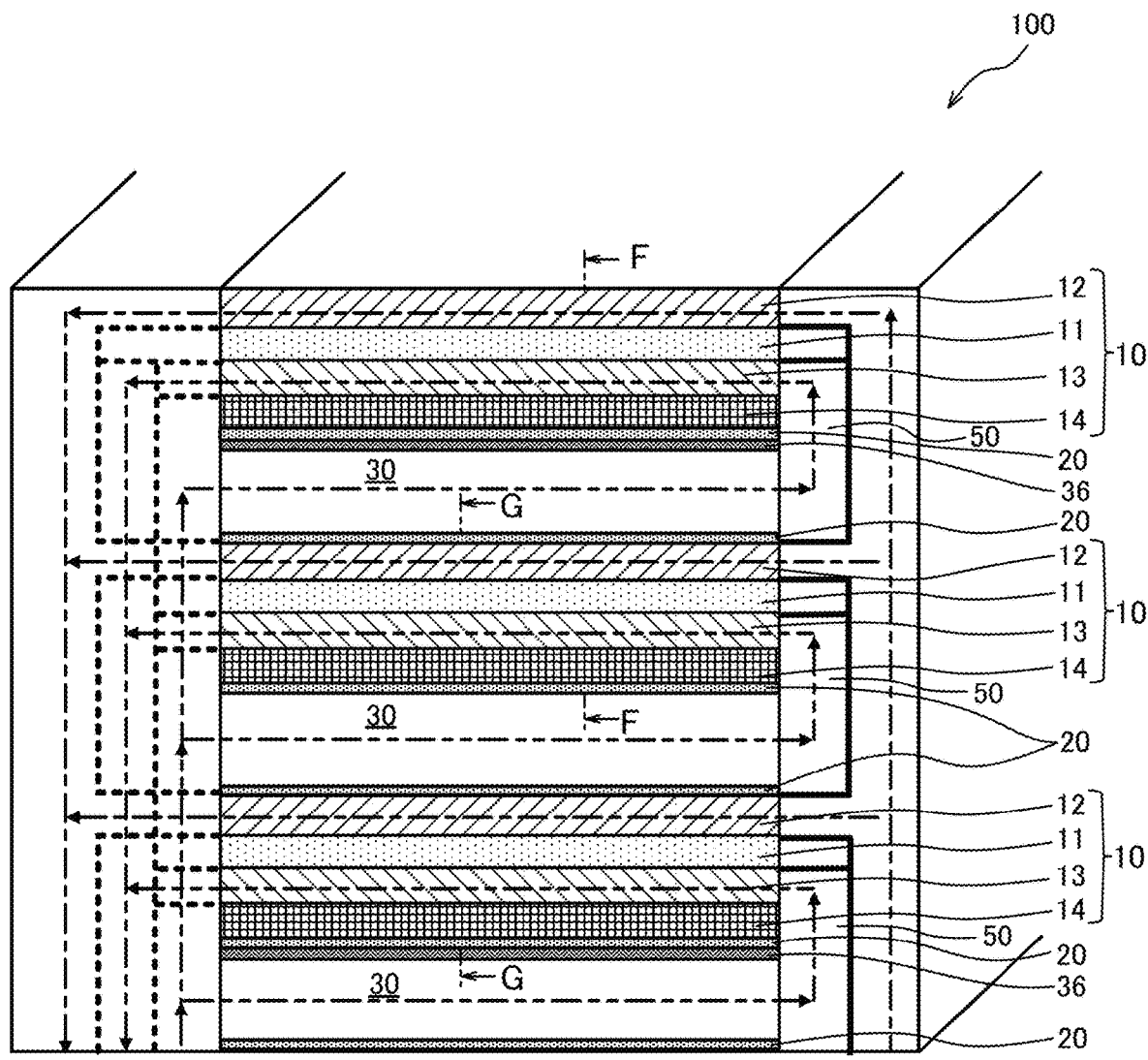
FIG. 12 is a schematic configuration diagram of a fuel cell stack according to a third embodiment.
Figure 13:
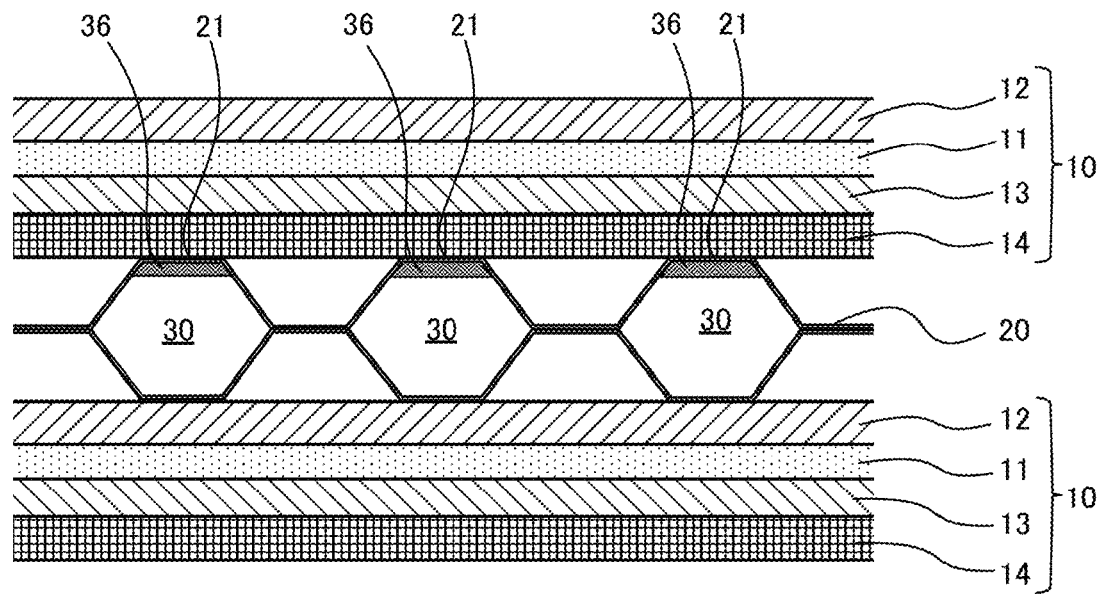
FIG. 13 is a sectional view taken along line F-F in FIG. 12.
Figure 14:
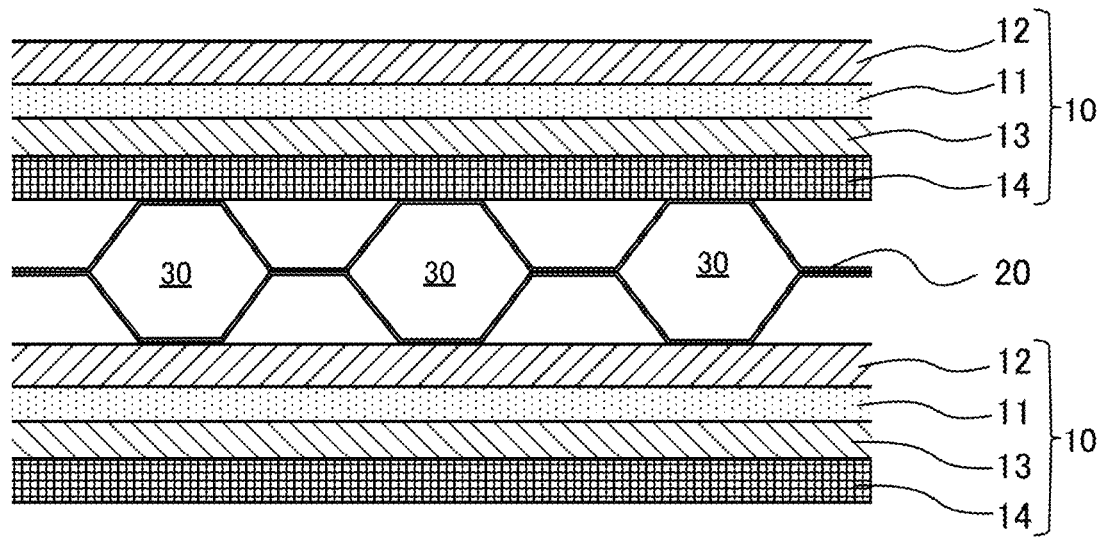
FIG. 14 is a sectional view taken along line G-G in FIG. 12.

The fuel cell stack 100 according to a third embodiment is described, with reference to FIGS. 12 to 14. The present embodiment differs from the first and second embodiments in a point that the thermal insulation material 36 is disposed inside the fuel channels 30 contacting the fuel cells 10 at the upper edge and lower edge in the stacking direction (fuel channels 30 at the stack edges) as means for adjusting the heat balance of the fuel cells 10. The same reference signs are denoted to the same components as those of the first and second embodiments, and the detailed descriptions have been omitted.

FIG. 12 is a schematic configuration diagram of the fuel cell stack 100 according to the third embodiment. As illustrated in FIG. 12, the thermal insulation material 36 is disposed in the fuel channels 30 at the stack edges. On the other hand, the fuel channels 30 at the stack center dispose no thermal insulation material 36.

The thermal insulation material 36 is not particularly limited as long as it exhibits thermal insulation properties, and for example a known thermal insulation paint is used.

FIG. 13 is a sectional view taken along line F-F in FIG. 12, and is a view describing the fuel channels 30 at the stack edges. FIG. 14 is a sectional view taken along line G-G in FIG. 12, and is a view describing the fuel channels 30 at the stack center.

As illustrated in FIG. 13, the thermal insulation material 36 is applied (disposed) on a surface of the fuel channels 30 facing the cathode electrode layer 12 (namely, on the inner circumferential surface side of the first abutting portion 21), inside the fuel channels 30 at the stack edges.

As described above, in the fuel cell stack 100 configured by stacking a plurality of the fuel cells 10, the closer to the stack edges, the easier heat is lost externally. On the other hand, the present embodiment disposes the thermal insulation material 36 inside the fuel channels 30 at the stack edges; this hence allows for holding down the loss of heat of the fuel cells 10 (anode electrode layers 13) at the stack edges.

On the other hand, as illustrated in FIG. 14, no thermal insulation material 36 is disposed inside the fuel channels 30 at the stack center; accordingly, at the stack center, the heat of the fuel cell 10 (anode electrode layer 13) is easily lost as compared to the stack edges.

As such, the heat balance of the fuel cells 10 is adjusted by whether or not the thermal insulation material 36 is disposed on the fuel channels 30. Namely, in the present embodiment, the thermal insulation material 36 functions as heat balance adjusting means for adjusting the heat balance of the fuel cells 10.

As described above, heat is not lost easily at the fuel cells 10 at the stack edges where the thermal insulation material 36 is disposed in the fuel channels 30, and hence temperature decrease is held down. On the other hand, the heat of the fuel cell 10 is easily lost and is easily cooled at the stack center where no thermal insulation material 36 is disposed in the fuel channels 30. Therefore, the temperature difference in the fuel cells 10 between the stack edges and the stack center become small, thus preventing the non-uniform temperature distribution of the fuel cells 10 in the stacking direction.

According to the fuel cell stack 100 of the aforementioned third embodiment, the following effects are achievable.

According to the fuel cell stack 100, the thermal insulation material 36 being the heat balance adjusting means for adjusting the heat balance of the fuel cells 10 is disposed within the fuel channels 30. The heat balance of the fuel cells 10 can thus be adjusted in the fuel channels 30, thereby allowing for adjusting the temperature of the fuel cells 10 without providing a radiator or the like separately to the stack. Therefore, it is possible to prevent the non-uniform temperature distribution in the stacking direction of the fuel cells 10, without increasing the size of the device.

According to the fuel cell stack 100, the thermal insulation material 36 is disposed within the fuel channels 30 contacting the fuel cells 10 at the upper edge and lower edge in the stacking direction (fuel channels 30 at the stack edges), on the surface facing the cathode electrode layer 12. Accordingly, in the fuel cells 10 at the stack edges, the heat is not easily lost and the temperature decrease is held down; hence, the temperature difference in the fuel cells 10 between the stack edges and the center becomes small. As such, the temperature decrease of the fuel cells 10 at the stack edges is held down by disposing the thermal insulation material 36 inside the fuel channels 30, without providing a radiator or the like separately to the stack. Therefore, it is possible to prevent the non-uniform temperature distribution in the stacking direction of the fuel cells 10, without increasing the size of the device.

Fourth Embodiment

Figure 15:
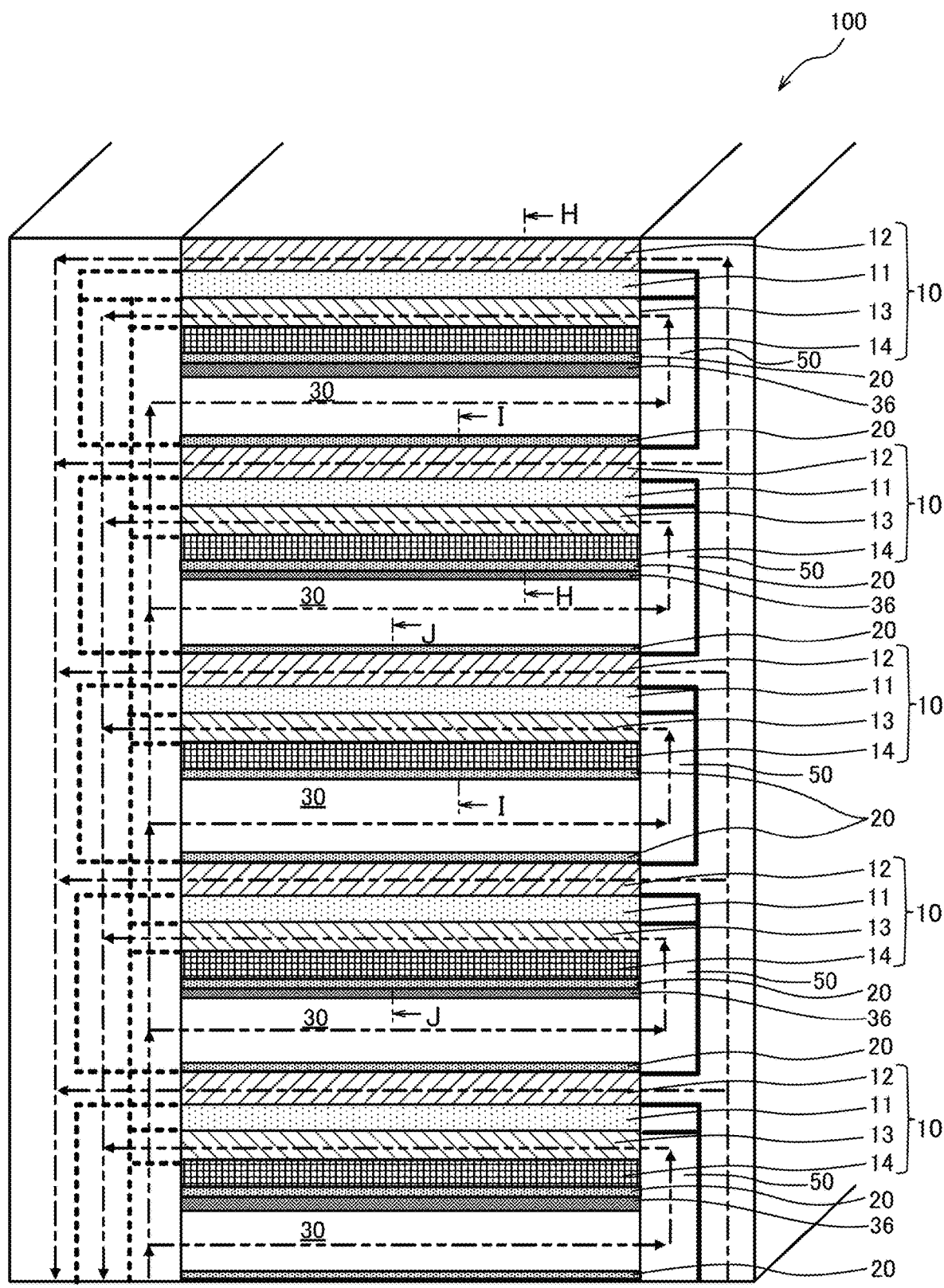
FIG. 15 is a schematic sectional view of a fuel cell stack according to a fourth embodiment.
Figure 16:
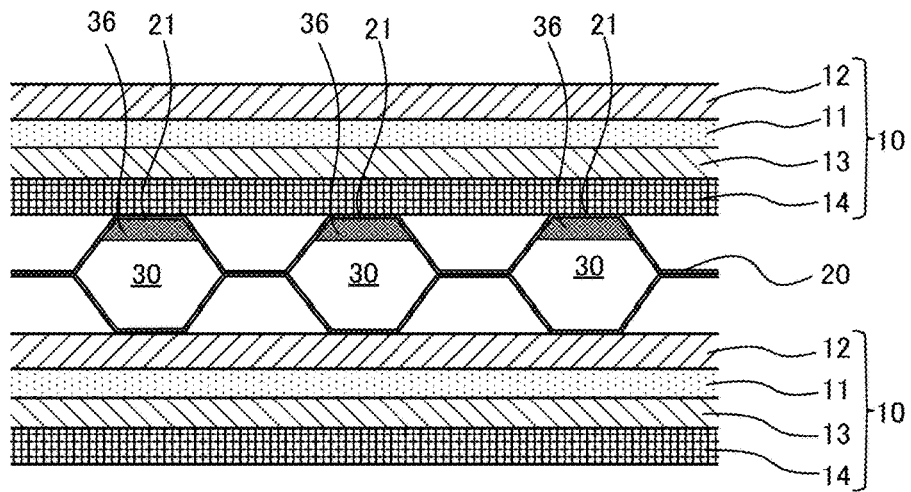
FIG. 16 is a sectional view taken along line H-H in FIG. 15.
Figure 17:
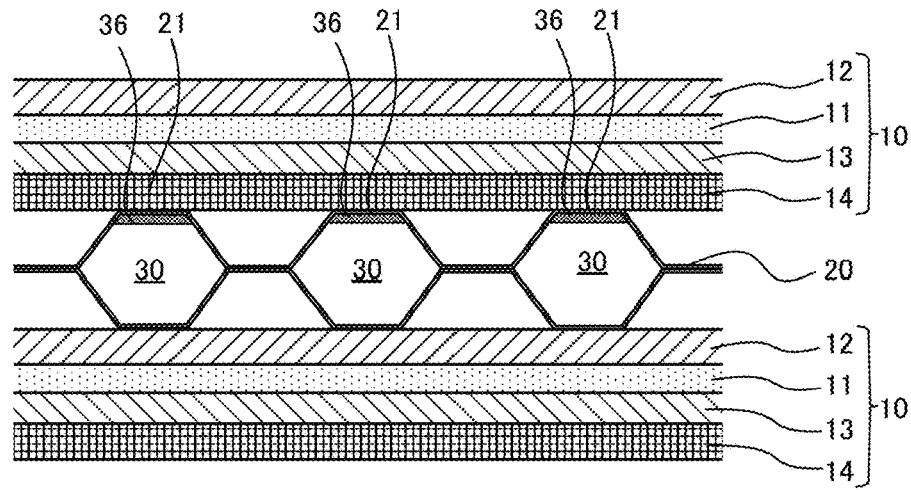
FIG. 17 is a sectional view taken along line I-I in FIG. 15.

The fuel cell stack 100 according to a fourth embodiment is described, with reference to FIGS. 15 to 17. The present embodiment differs from the third embodiment in a point that the fuel channels 30 contacting the fuel cells 10 closer to the edge in the stacking direction (fuel channels 30 close to the stack edges) has more of the thermal insulation material 36 disposed within the fuel channels 30. The same reference signs are denoted to the same components as those of the other embodiments, and the detailed descriptions have been omitted.

FIG. 15 is a schematic configuration diagram of the fuel cell stack 100 according to the fourth embodiment. As illustrated in FIG. 15, the thermal insulation material 36 is disposed within the fuel channels 30.

FIG. 16 is a sectional view taken along line H-H in FIG. 15, and is a view describing the fuel channels 30 at the stack edges. FIG. 17 is a sectional view taken along line I-I in FIG. 15, and is a view describing the fuel channels 30 between the stack center and the stack edges. Moreover, FIG. 18 is a sectional view taken along line J-J in FIG. 15, and is a view describing the fuel channels 30 at the stack center.

As illustrated in FIG. 16, the thermal insulation material 36 is applied on a surface of the fuel channels 30 facing the cathode electrode layer 12 (on the inner circumferential surface side of the first abutting portion 21), inside the fuel channels 30 at the stack edges. Therefore, as with the third embodiment, heat of the fuel cells 10 (anode electrode layers 13) is not easily lost at the stack edges.

Next, as illustrated in FIG. 17, the thermal insulation material 36 is disposed inside the fuel channels 30 between the stack center and the stack edges. However, the thickness of the thermal insulation material 36 is thinner than the thermal insulation material 36 disposed within the fuel channels 30 at the stack edge illustrated in FIG. 16. Therefore, the fuel channels 30 between the stack center and the stack edges have a thermal insulation effect of a certain degree, however the heat of the fuel cells 10 (anode electrode layers 13) is easily lost than at the stack edges. Namely, the fuel cells 10 easily cool between the stack center and the stack edges than at the stack edge.

Figure 18:
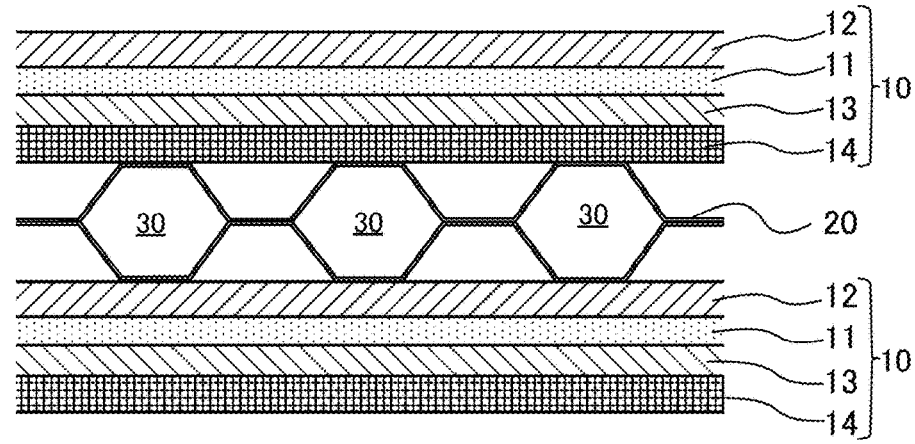
FIG. 18 is a sectional view taken along line J-J in FIG. 15.

On the other hand, as illustrated in FIG. 18, the fuel channels 30 at the stack center disposes no thermal insulation material 36. Therefore, as compared to the stack edges and between the stack center and the stack edges, the heat of the fuel cells 10 (anode electrode layers 13) is easily lost, and the fuel cells 10 are more easily cooled.

As described above, the magnitude of the heat lost from the fuel cells 10 can be adjusted by the thickness (amount) of the thermal insulation material 36 disposed within the fuel channels 30. Namely, the thermal insulation material 36 functions as the heat balance adjusting means for adjusting the heat balance of the fuel cells 10. Furthermore, by disposing more of the thermal insulation material 36 in the fuel channels 30 closer to the edges in the stacking direction, the amount of heat lost from the fuel cells 10 closer to the edges in the stacking direction is decreased, thus holding down the temperature decrease. Accordingly, the non-uniform temperature distribution in the stacking direction of the fuel cells 10 is prevented.

According to the fuel cell stack 100 of the aforementioned fourth embodiment, the following effects are achievable.

According to the fuel cell stack 100, the thermal insulation material 36 being the heat balance adjusting means for adjusting the heat balance of the fuel cells 10 is disposed within the fuel channels 30. The heat balance of the fuel cells 10 can thus be adjusted in the fuel channels 30, thereby allowing for adjusting the temperature of the fuel cells 10 without providing a radiator or the like separately to the stack. Therefore, it is possible to prevent the non-uniform temperature distribution in the stacking direction of the fuel cells 10, without increasing the size of the device.

According to the fuel cell stack 100, more of the thermal insulation material 36 is disposed inside the fuel channels 30 in the fuel channels 30 contacting the fuel cells 10 closer to the edges in the stacking direction. This makes the fuel cells 10 closer to the stack edges difficult to lose heat, which holds down the temperature decrease, thus preventing the non-uniform temperature distribution in the stacking direction of the fuel cells 10. As such, the temperature of the fuel cells 10 is adjusted by adjusting the amount of the thermal insulation material 36 disposed in the fuel channels 30, without providing a radiator or the like separately to the stack. Therefore, it is possible to prevent the non-uniform temperature distribution in the stacking direction of the fuel cells 10, without increasing the size of the device.

The present embodiment describes by using an example stacking five fuel cells 10, however the number of the fuel cells 10 stacked can be any number, as long as the fuel channels 30 closer to the edge in the stacking direction has more thermal insulation material 36 disposed within the fuel channels 30.

Moreover, in the present embodiment, no thermal insulation material 36 is disposed within the fuel channels 30 at the stack center, however it is not limited to this, and the thermal insulation material 36 may be disposed within the fuel channels 30 at the stack center. However, in this case, the thermal insulation material 36 of an amount (thickness) less than within the fuel channels 30 between the stack center and the stack edges is disposed (applied) within the fuel channels 30 at the stack center.

Fifth Embodiment

Figure 19:
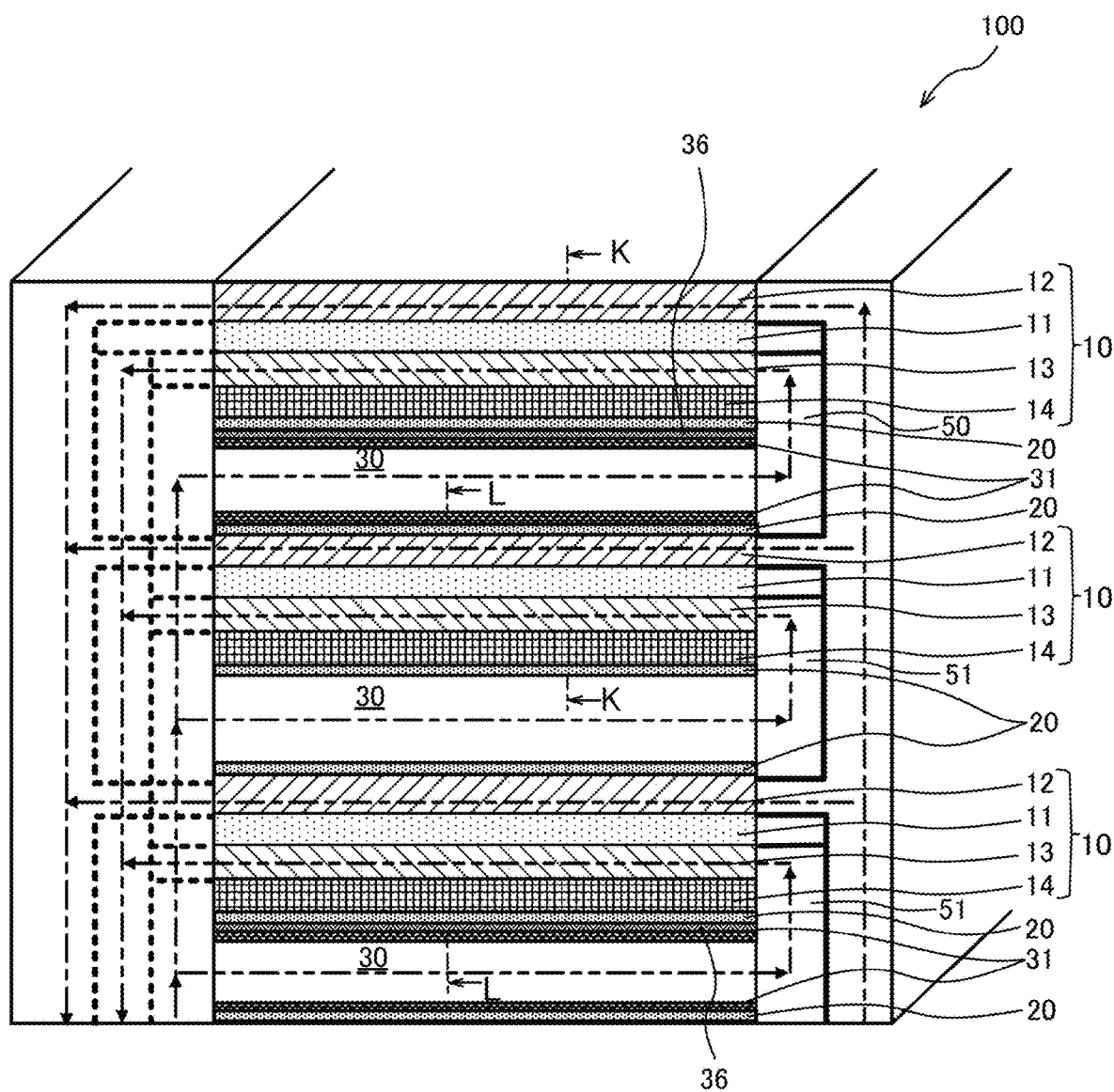
FIG. 19 is a schematic sectional view of a fuel cell stack according to a fifth embodiment.
Figure 20:
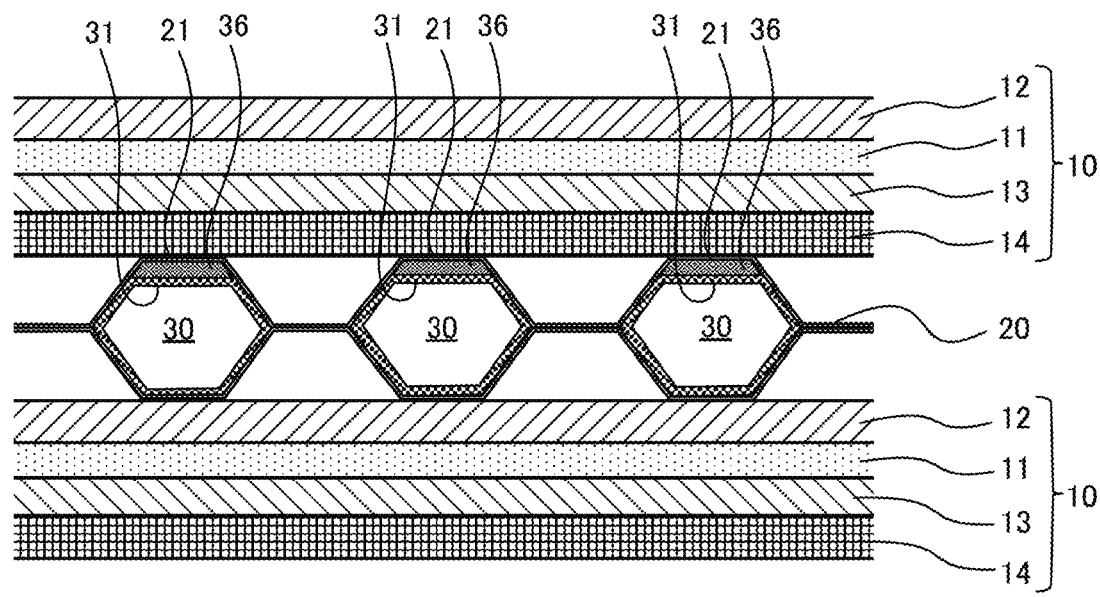
FIG. 20 is a sectional view taken along line K-K in FIG. 19.
Figure 21:
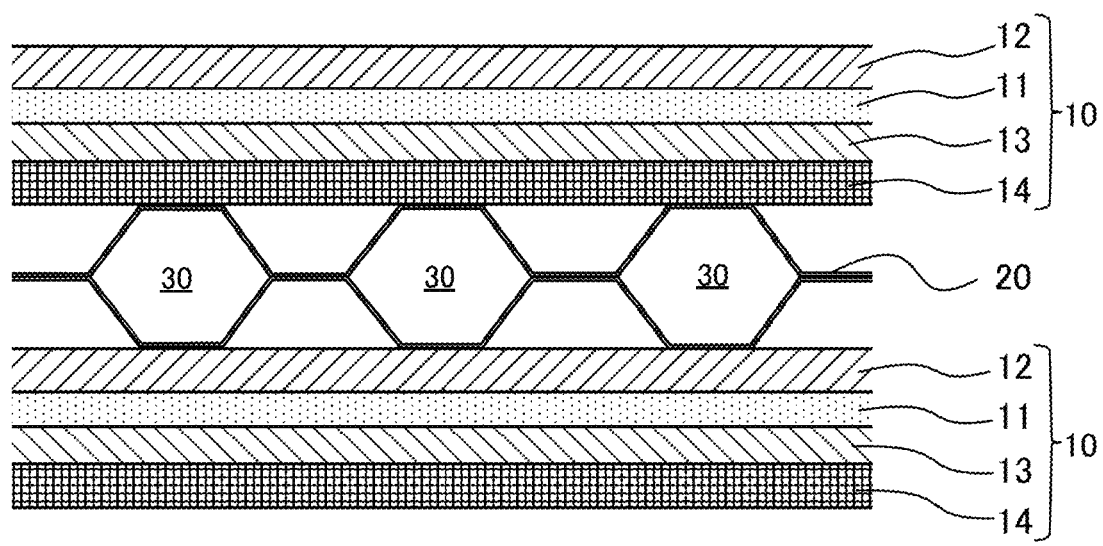
FIG. 21 is a sectional view taken along line L-L in FIG. 19.

The fuel cell stack 100 according to a fifth embodiment is described, with reference to FIGS. 19 to 21. The present embodiment differs from the other embodiments in a point that the thermal insulation material 36 and the reforming catalyst 31 are disposed inside the fuel channels 30 contacting the fuel cells 10 at the upper edge and lower edge in the stacking direction (fuel channels 30 at the stack edge), as means for adjusting the heat balance of the fuel cells 10. The same reference signs are denoted to the same components as those of the other embodiments, and the detailed descriptions have been omitted.

FIG. 19 is a schematic configuration diagram of the fuel cell stack 100 according to the fifth embodiment.

As illustrated in FIG. 19, the thermal insulation material 36 and the reforming catalyst 31 are disposed in the fuel channels 30 at the stack edges. On the other hand, the fuel channels 30 at the stack center disposes no thermal insulation material 36 nor reforming catalyst 31.

FIG. 20 is a sectional view taken along line K-K in FIG. 19, and is a view describing the fuel channels 30 at the stack edges. FIG. 21 is a sectional view taken along line L-L in FIG. 19, and is a view describing the fuel channels 30 at the stack center.

As illustrated in FIG. 20, the thermal insulation material 36 is applied on a surface of the fuel channels 30 facing the cathode electrode layer 12 (on the inner circumferential surface side of the first abutting portion 21), inside the fuel channels 30 at the stack edges. Moreover, the reforming catalyst 31 is disposed (applied) on a surface of the thermal insulation material 36 facing the cathode electrode layer 12 (on the thermal insulation material 36) and on a surface of the separator 20 configuring the inner circumferential surface of the fuel channels 30.

As described above, in the fuel cell stack 100 configured by stacking a plurality of the fuel cells 10, the closer to the stack edges, the easier heat is lost externally. On the other hand, in the present embodiment, the thermal insulation material 36 and the reforming catalyst 31 are disposed inside the fuel channels 30 at the stack edges as described above. Therefore, the heat loss of the fuel cells 10 (anode electrode layers 13) at the stack edges is held down by the carrier 34 of the reforming catalyst 31 and the thermal insulation effect of the thermal insulation material 36.

Moreover, within the fuel channels 30 at the stack edges, the reforming catalyst 31 is disposed on the surface of the thermal insulation material 36 and on the inner circumferential surface of the fuel channels 30; accordingly, the reforming reaction of the fuel is promoted by the reforming catalyst 31 and occurs mainly within the fuel channels 30. As described above, the reforming reaction is a heat absorbing reaction; by the carrier 34 of the reforming catalyst 31 and the thermal insulation effect of the thermal insulation material 36, the heat of the fuel cells 10 (anode electrode layers 13) at the stack edges is hardly absorbed. The anode gas reformed within the fuel channels 30 at the stack edges is supplied to the anode electrode layers 13 via the U-turn channels 50.

On the other hand, as illustrated in FIG. 21, no thermal insulation material 36 nor reforming catalyst 31 is disposed inside the fuel channels 30 at the stack center; accordingly, at the stack center, the heat of the fuel cells 10 (anode electrode layers 13) is easily lost and is easily cooled, as compared to the stack edges.

Moreover, no reforming catalyst 31 is disposed inside the fuel channels 30 at the stack center; accordingly, unreformed fuel is supplied at the stack center to the anode electrode layers 13 via the U-turn channels 50, and the reforming reaction occurs within the anode electrode layers 13. Therefore, at the stack center, the heat of the fuel cells 10 is absorbed by the reforming reaction (heat absorbing reaction) in the anode electrolyte layers 13, and the fuel cells 10 are cooled by the reforming reaction.

As such, the heat balance of the fuel cells 10 is adjusted by whether or not the thermal insulation material 36 and the reforming catalyst 31 are disposed in the fuel channels 30. Namely, in the present embodiment, the thermal insulation material 36 and the reforming catalyst 31 function as the heat balance adjusting means for adjusting the heat balance of the fuel cells 10.

As described above, heat is not lost easily at the fuel cells 10 at the stack edges where the thermal insulation material 36 and the reforming catalyst 31 are disposed in the fuel channels 30, and hence the temperature decrease is held down. On the other hand, the heat of the fuel cells 10 is easily lost and is easily cooled at the stack center where no thermal insulation material 36 nor reforming catalyst 31 is disposed in the fuel channels 30. Therefore, the temperature difference in the fuel cells 10 between the stack edges and the stack center become small, thus preventing the non-uniform temperature distribution of the fuel cells 10 in the stacking direction.

According to the fuel cell stack 100 of the aforementioned fifth embodiment, the following effects are achievable.

According to the fuel cell stack 100, the reforming catalyst 31 and the thermal insulation material 36 being the heat balance adjusting means for adjusting the heat balance of the fuel cells 10 are disposed inside the fuel channels 30. Accordingly, the heat balance of the fuel cells 10 can be adjusted in the fuel channels 30, thus allowing for adjusting the temperature of the fuel cells 10 without providing a radiator or the like separately to the stack. Therefore, it is possible to prevent the non-uniform temperature distribution in the stacking direction of the fuel cells 10, without increasing the size of the device.

According to the fuel cell stack 100, the thermal insulation material 36 is disposed inside the fuel channels 30 contacting the fuel cells 10 at the upper edge and lower edge in the stacking direction (fuel cells 10 at the stack edges), on the surfaces facing the cathode electrode layers 12. Moreover, the reforming catalyst 31 is disposed within the fuel channels 30 contacting the fuel cells 10 at the upper edge and lower edge in the stacking direction (fuel cells 10 at the stack edges), on the inner circumferential surfaces of the fuel channels 30 and on the thermal insulation material 36. Accordingly, in the fuel cells 10 at the stack edges, the heat is not easily lost and the temperature decrease is prevented; accordingly, the temperature difference in the fuel cells 10 between the stack edge and the center becomes small. As such, the temperature decrease in the fuel cells 10 at the stack edges is held down by disposing the thermal insulation material 36 and the reforming catalyst 31 inside the fuel channels 30, without providing a radiator or the like separately to the stack. Therefore, it is possible to prevent the non-uniform temperature distribution in the stacking direction of the fuel cells 10, without increasing the size of the device.

Sixth Embodiment

The fuel cell stack 100 according to a sixth embodiment is described, with reference to FIGS. 22 to 25. The present embodiment differs from the fifth embodiment in a point that the fuel channels 30 contacting the fuel cells 10 closer to the edges in the stacking direction (fuel channels 30 close to the stack edges) have more of the thermal insulation material 36 and the reforming catalyst 31 disposed within the fuel channels 30. The same reference signs are denoted to the same components as those of the other embodiments, and the detailed descriptions have been omitted.

Figure 22:
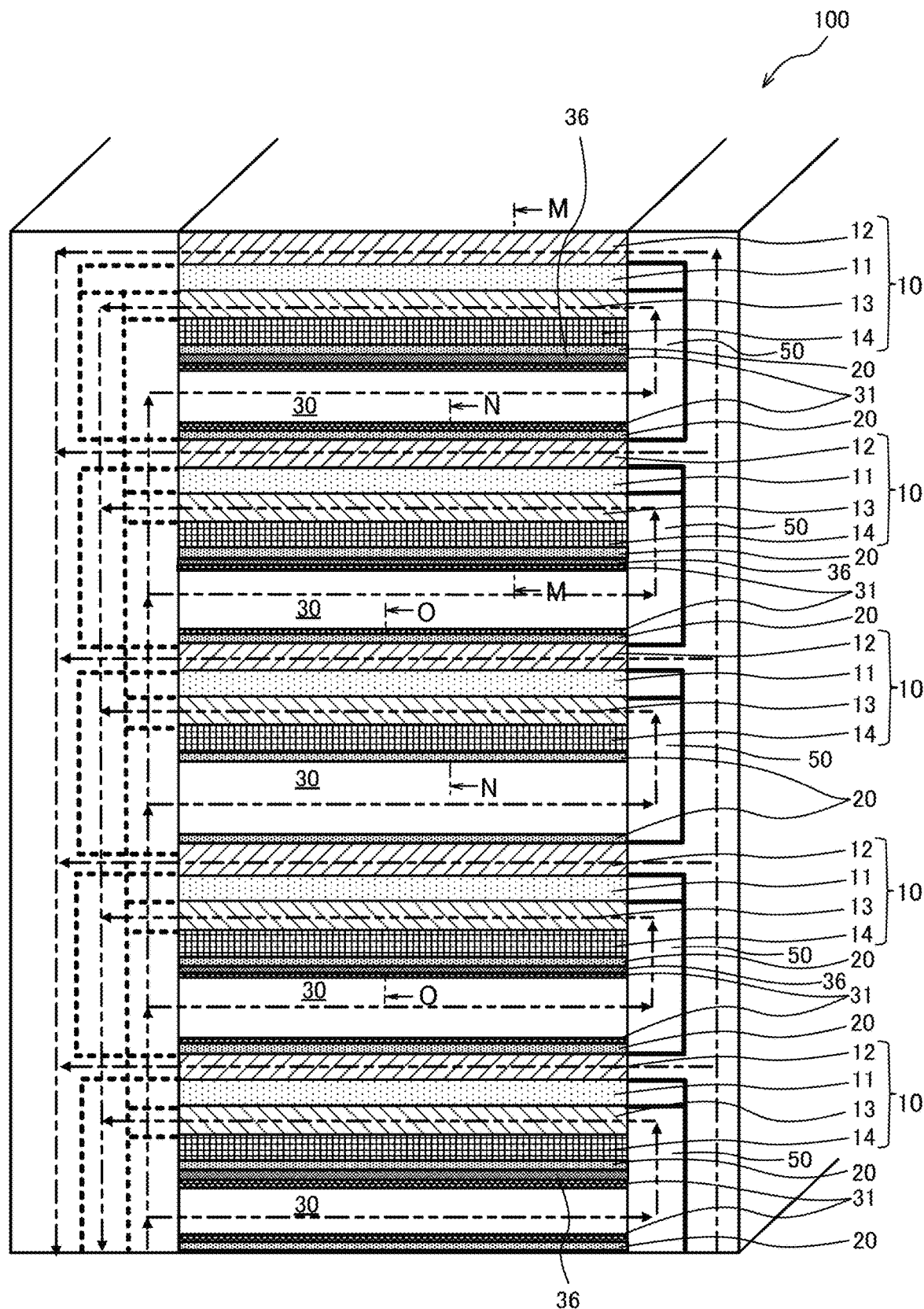
FIG. 22 is a schematic configuration diagram of a fuel cell stack according to a sixth embodiment.

FIG. 22 is a schematic configuration diagram of the fuel cell stack 100 according to the sixth embodiment. As illustrated in FIG. 22, the thermal insulation material 36 and the reforming catalyst 31 are disposed in the fuel channels 30.

Figure 23:
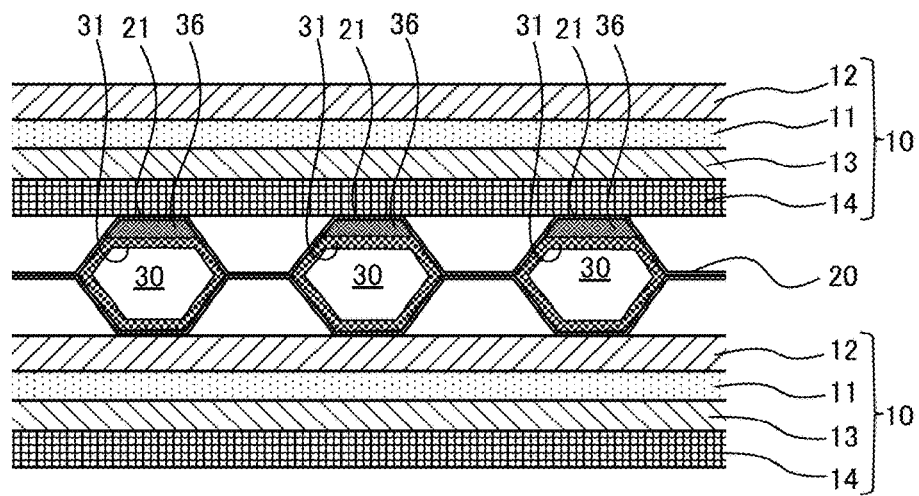
FIG. 23 is a sectional view taken along line M-M in FIG. 22.
Figure 24:
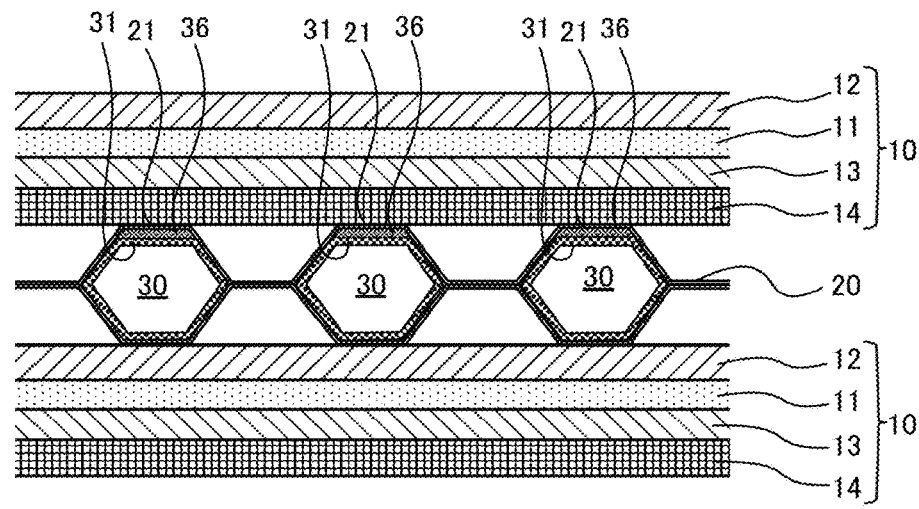
FIG. 24 is a sectional view taken along line N-N in FIG. 22.

FIG. 23 is a sectional view taken along line M-M in FIG. 22, and is a view describing the fuel channels 30 at the stack edges. FIG. 24 is a sectional view taken along line N-N in FIG. 22, and is a view describing the fuel channels 30 between the stack center and the stack edges. Moreover, FIG. 25 is a sectional view taken along line O-O in FIG. 22, and is a view describing the fuel channels 30 at the stack center.

As illustrated in FIG. 23, inside the fuel channels 30 at the stack edges, the thermal insulation material 36 is applied on the surface of the fuel channels 30 facing the cathode electrode layers 12 (on the inner circumferential surface side of the first abutting portion 21), and on the thermal insulation material 36 and the inner circumferential surface of the fuel channels 30, the reforming catalyst 31 is disposed (applied). Therefore, as with the fifth embodiment, heat of the fuel cells 10 (anode electrode layers 13) is not lost easily at the stack edges.

Next, as illustrated in FIG. 24, inside the fuel channels 30 between the stack center and the stack edges also, the thermal insulation material 36 is applied on the surfaces of the fuel channels 30 facing the cathode electrode layers 12 (the inner circumferential surface side of the first abutting portion 21), and the reforming catalyst 31 is disposed (applied) on the thermal insulation material 36 and the inner circumferential surfaces of the fuel channels 30. However, the thickness of the thermal insulation material 36 is thinner than the thermal insulation material 36 disposed within the fuel channels 30 at the stack edges illustrated in FIG. 23. Moreover, the thickness of the reforming catalyst 31 is also thinner than the reforming catalyst 31 disposed within the fuel channels 30 at the stack edges illustrated in FIG. 23. Therefore, the fuel channels 30 between the stack center and the stack edges have a thermal insulation effect of a certain degree, however the thermal insulation effect is not as large as the fuel channels 30 at the stack edges. Moreover, since the amount of the reforming catalyst 31 is less than the reforming catalyst 31 disposed in the fuel channels 30 at the stack edges, the fuel supplied to the anode electrode layers 13 unreformed and being reformed within the anode electrode layers 13 is greater than that at the stack edges. Therefore, in the fuel cells 10 (anode electrode layers 13) between the stack center and the stack edges, the heat is easily lost and is easily cooled than that at the stack edges.

Figure 25:
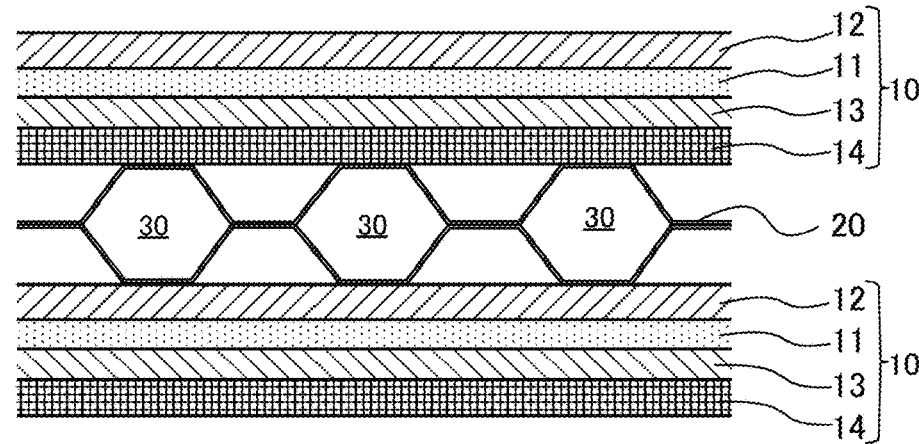
FIG. 25 is a sectional view taken along line O-O in FIG. 22.

On the other hand, as illustrated in FIG. 25, the fuel channels 30 at the stack center dispose no thermal insulation material 36 nor reforming catalyst 31. Therefore, as compared to the stack edges and between the stack center and the stack edges, the thermal insulation effect by the fuel channels 30 is smaller. Moreover, since the reforming of fuel mainly occurs within the anode electrode layers 13, the heat absorption due to the reforming reaction (heat absorption) with respect to the fuel cells 10 is large. Namely, the heat of the fuel cells 10 (anode electrode layers 13) is easily lost than at the stack edges and between the stack center and the stack edges, and the fuel cells 10 are more easily cooled.

As described above, the magnitude of the heat lost from the fuel cells 10 can be adjusted by the thickness (amount) of the thermal insulation material 36 and the reforming catalyst 31 disposed within the fuel channels 30. Namely, the thermal insulation material 36 and the reforming catalyst 31 function as the heat balance adjusting means for adjusting the heat balance of the fuel cells 10. Furthermore, by disposing more of the thermal insulation material 36 and the reforming catalyst 31 in the fuel channels 30 closer to the edges in the stacking direction, the amount of heat lost from the fuel cells 10 closer to the edges in the stacking direction is decreased, thus holding down the temperature decrease. Accordingly, the non-uniform temperature distribution in the stacking direction of the fuel cells 10 is prevented.

According to the fuel cell stack 100 of the aforementioned sixth embodiment, the following effects are achievable.

According to the fuel cell stack 100, the reforming catalyst 31 and the thermal insulation material 36 being the heat balance adjusting means for adjusting the heat balance of the fuel cells 10 are disposed inside the fuel channels 30. The heat balance of the fuel cells 10 can be adjusted in the fuel channel 30, thus allowing for adjusting the temperature of the fuel cells 10 without providing a radiator or the like separately to the stack. Therefore, it is possible to prevent the non-uniform temperature distribution in the stacking direction of the fuel cells 10, without increasing the size of the device.

According to the fuel cell stack 100, more of the thermal insulation material 36 and the reforming catalyst 31 are disposed inside the fuel channels 30 in the fuel channels 30 contacting the fuel cells 10 closer to the edges in the stacking direction. This makes the fuel cells 10 closer to the stack edges lose less heat in the fuel cells 10, which holds down the temperature decrease, thus preventing the non-uniform temperature distribution in the stacking direction of the fuel cells 10. As such, the temperature of the fuel cells 10 is adjusted by adjusting the amount of the thermal insulation material 36 and the reforming catalyst 31 disposed in the fuel channels 30, without providing a radiator or the like separately to the stack. Therefore, it is possible to prevent the non-uniform temperature distribution in the stacking direction of the fuel cells 10, without increasing the size of the device.

The present embodiment describes by using an example stacking five fuel cells 10, however the number of the fuel cells 10 stacked can be any number, as long as the fuel channels 30 closer to the edges in the stacking direction have more thermal insulation material 36 and reforming catalyst 31 disposed within the fuel channels 30.

Moreover, in the present embodiment, no thermal insulation material 36 nor reforming catalyst 31 is disposed within the fuel channels 30 at the stack center, however it is not limited to this, and the thermal insulation material 36 and reforming catalyst 31 may be disposed within the fuel channels 30 at the stack center. However, in this case, the thermal insulation material 36 and the reforming catalyst 31 of an amount (thickness) less than the fuel channels 30 between the stack center and the stack edges is disposed (applied) within the fuel channels 30 at the stack center.

Seventh Embodiment

Figure 26:
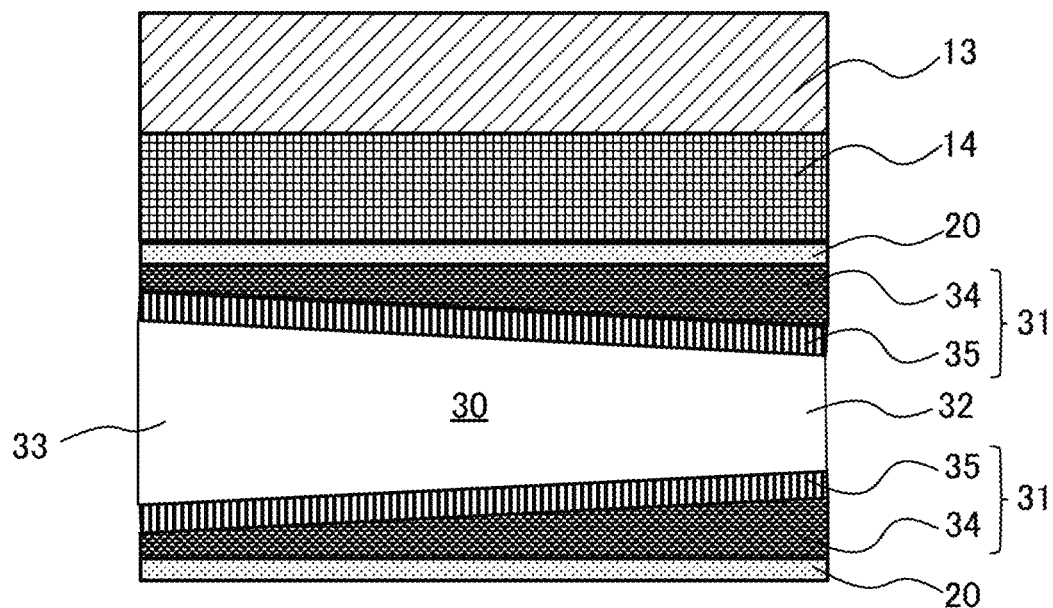
FIG. 26 is a schematic view of a fuel channel in a fuel cell stack according to a seventh embodiment.

The fuel cell stack 100 according to a seventh embodiment is described, with reference to FIG. 26. The present embodiment differs from the other embodiments in a point that the thickness of the carrier 34 of the reforming catalyst 31 within the same fuel channel 30 is changed. The same reference signs are denoted to the same components as those of the other embodiments, and the detailed descriptions have been omitted.

FIG. 26 is a schematic view of the fuel channel 30 in the fuel cell stack 100 according to the seventh embodiment, and illustrates the fuel channel 30 applied with the reforming catalyst 31. As with the first and second embodiments, no reforming catalyst 31 is applied on the fuel channel 30 on the stack center.

As illustrated in FIG. 26, the thickness of the carrier 34 of the reforming catalyst 31 applied on the fuel channel 30 becomes thicker as the carrier 34 approaches the outlet (one end) 32 of the fuel channel 30 from where the fuel goes out to the U-turn channel 50, from the inlet (other end) 33 of the fuel channel 30 from where the fuel is supplied.

The reforming reaction (heat absorbing reaction) within the fuel channels 30 easily occurs around the inlet from which the fuel is supplied; hence, within the same fuel channel 30, the temperature tends to decrease around the inlet 33. Therefore, by reducing the thickness of the carrier 34 around the inlet 33 of the fuel channel 30 as in the present embodiment to reduce the thermal insulation effect of the carrier 34, the thermal conduction from the fuel cells 10 around the inlet 33 of the fuel channels 30 is promoted. This hence prevents the non-uniform temperature distribution within the same fuel channel 30.

By adjusting the thickness of the reforming catalyst 31 within the same fuel channel 30 as such, the heat balance of the fuel channels 30 and the fuel cells 10 can be adjusted.

Figure 27:
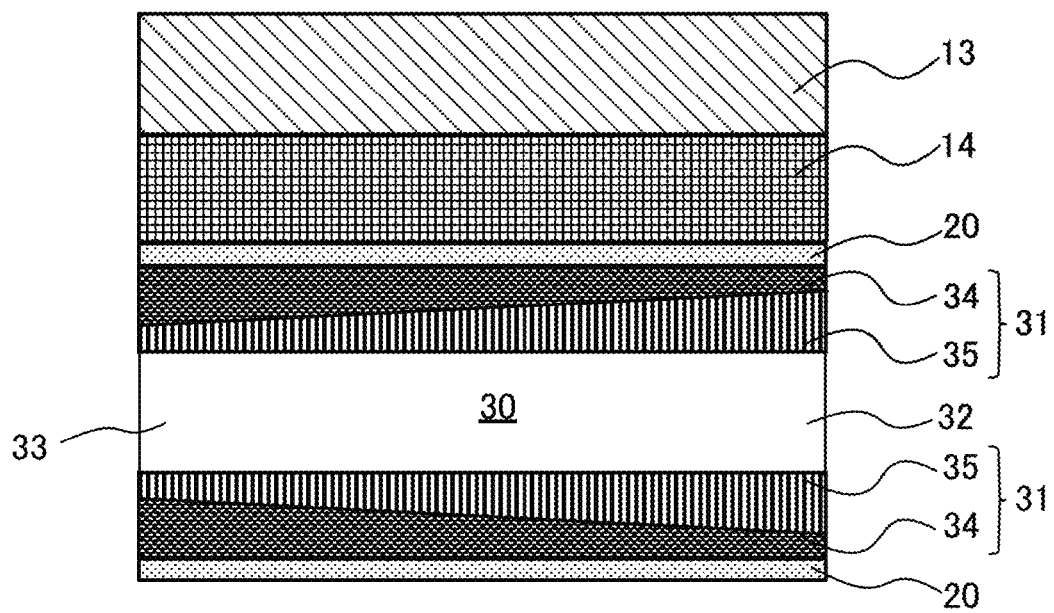
FIG. 27 is a schematic view of a fuel channel according to a modification.

In the present embodiment, the heat balance with the fuel cells 10 within the same fuel channel 30 is adjusted by adjusting the thickness of the reforming catalyst 31, however the heat balance with the fuel cells 10 may be adjusted by adjusting the thickness of the carrier 34 of the reforming catalyst 31 and the thickness of the catalyst fine particles 35. For example, as illustrated in FIG. 27, the closer to the inlet 33 of the fuel channel 30, the thicker the carrier 34 is made in the reforming catalyst 31, and the closer to the outlet 32 of the fuel channel 30, the thicker the catalyst fine particles 35 are made. Accordingly, the closer to the inlet of the fuel channel 30, a greater thermal insulation effect by the carrier 34 is achieved. On the other hand, the closer to the outlet 32 of the fuel channel 30, the smaller the thermal insulation effect is, and the heat of the fuel cells 10 is easily absorbed by the reforming reaction. This thus prevents the non-uniform temperature distribution within the same fuel channel 30.

Moreover, the heat balance between the fuel channels 30 and the fuel cells 10 is adjusted by disposing the reforming catalyst 31 on the upper surface of the thermal insulation material 36 and adjusting the thickness of the thermal insulation material 36 within the same fuel channel 30.

As described above, in the present embodiment, the heat balance of the fuel cell 10 is adjusted by using the reforming catalyst 31 or the thermal insulation material 36. However, means for adjusting the heat balance of the fuel cells 10 is not limited to this. For example, it is also possible to adjust the heat balance of the fuel cells 10 by changing the thickness of the separators 20 configuring the fuel channels 30.

In any embodiment, channel diameters of the fuel channels 30 do not necessarily need to be constant. For example, the channel diameter of a fuel channel 30 where the thermal insulation effect is desirably great may be made large to dispose more of the thermal insulation material 36 and the reforming catalyst 31.

Figure 28:
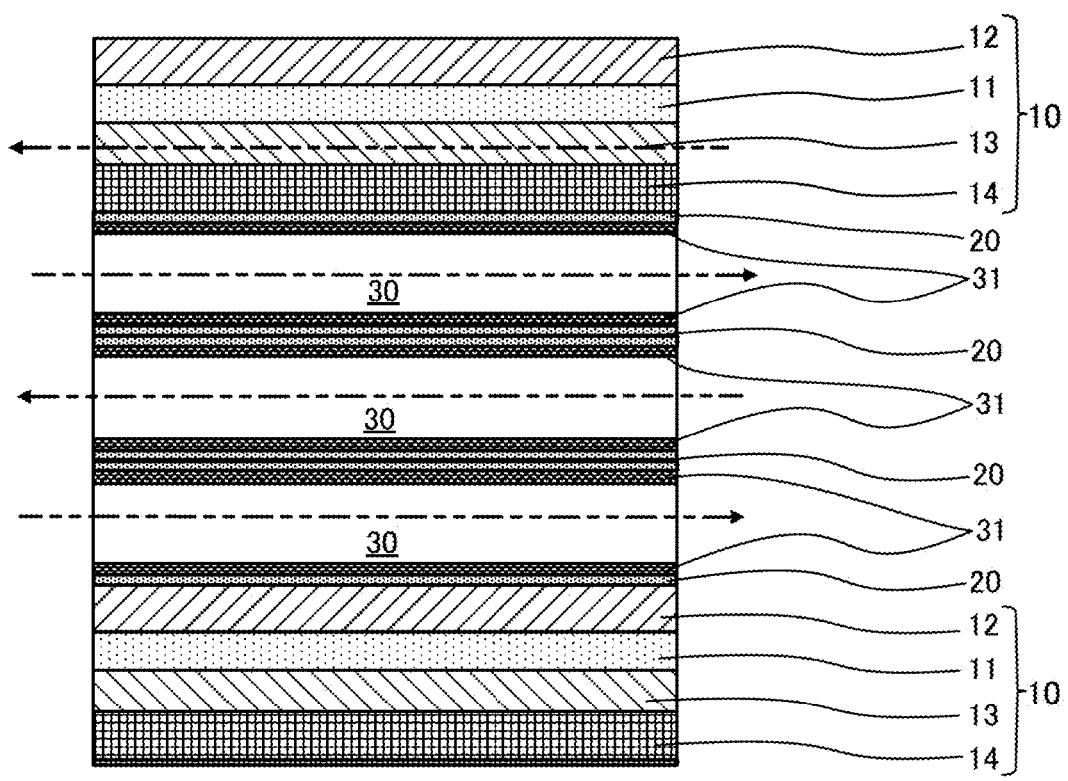
FIG. 28 is a schematic view of a fuel channels according to a modification.

Moreover, all of the embodiments are of a configuration in which one fuel channel 30 in the stacking direction is formed between adjacent fuel cells 10, however it is not necessarily limited to this. For example, as in FIG. 28, this may be of a configuration in which three fuel channels 30 in the stacking direction are provided between adjacent fuel cells 10, and the fuel being made to U-turn three times. By making the fuel channels 30 long as such, it is possible to more securely reform the fuel within the fuel channels 30.

Moreover, the fuel channels 30 are preferably of a hexagonal shape whose section in a direction perpendicular to a direction along the fuel channel 30 has the bent portion 25 for absorbing expansion displacement of the fuel cells 10, however it is not necessarily limited to this. For example, this may be configured as a rectangular shape not having the bent portion 25, and also may be configured in a bent shape.

Moreover, the reforming catalyst 31 disposed in the fuel channels 30 is preferably applied on the entire inner circumference of the fuel channels 30 to promote the reforming reaction more, however it is not necessarily limited to this, and the reforming catalyst 31 may be disposed on one portion within the fuel channels 30.

Moreover, the thermal insulation material 36 disposed in the fuel channels 30 is at least disposed on the surfaces facing the cathode electrode layers 12 within the fuel channels 30 to thermally insulate the anode electrode layers 13; in addition, the thermal insulation material 36 may be disposed on other portions on the inner circumference of the fuel channels 30.

The above describes embodiment of the present invention, however the above embodiments merely illustrate one portion of application examples of the present invention, and does not intend to limit the technical range of the present invention to the specific configurations in the above embodiments.

Moreover, each of the embodiments described above are explained as separate embodiments, however these can be combined as appropriate.

The invention claimed is:

1. A fuel cell stack comprising:
   a plurality of fuel cells stacked in a stacking direction, each comprising an anode electrode layer, a cathode electrode layer, and a solid electrolyte layer sandwiched between the anode electrode layer and the cathode electrode layer;
   a plurality of separators, each located between adjacent two of the fuel cells;
   a plurality of fuel channels through which fuel passes, each fuel channel located between adjacent two of the fuel cells via the separators, wherein the fuel channels include a first fuel channel located between a first two of adjacent fuel cells located at an edge of the fuel cell stack, and a second fuel channel located between a second two of adjacent fuel cells located inward of the first two of adjacent fuel cells in the stacking direction, the fuel channels are formed extending in a stacking surface direction of the fuel cells;
   a plurality of U-turn channels, each configured to connect one of the fuel channels to a respective one of the anode electrode layers; and
   a heat balance adjusting means disposed in at least one of the plurality of fuel channels so as to adjust the heat balance of the fuel cells such that a temperature decrease of the first two of the adjacent fuel cells is suppressed and a temperature increase of the second two of the adjacent fuel cells is suppressed.

2. The fuel cell stack according to claim 1, wherein
   the heat balance adjusting means comprises a reforming catalyst,
   the first two of adjacent fuel cells is located at an upper edge of the fuel cell stack in a stacking direction, and
   the reforming catalyst is disposed inside the first fuel channel.

3. The fuel cell stack according to claim 1, wherein
   the heat balance adjusting means comprises a reforming catalyst,
   the reforming catalyst is disposed inside the first and second fuel channels, and
   more of the reforming catalyst is disposed within the first fuel channel than in the second fuel channel.

4. The fuel cell stack according to claim 3, wherein a center fuel channel of the plurality of fuel cells in the stacking direction does not include the reforming catalyst.

5. The fuel cell stack according to claim 3, further comprising a third fuel channel positioned between a third two of the adjacent fuel cells, the third two of the adjacent fuel cells located inward of the second two of the adjacent fuel cells,
   wherein more of the reforming catalyst is disposed within the second fuel channel than in the third fuel channel.

6. The fuel cell stack according to claim 1, wherein
   the first two of adjacent fuel cell is located at an upper edge of the fuel cell stack in a stacking direction,
   the heat balance adjusting means comprises a thermal insulation material, and
   the thermal insulation material is disposed on at least a surface of the first fuel channel facing the respective cathode electrode layer.

7. The fuel cell stack according to claim 1, wherein
   the heat balance adjusting means comprises a thermal insulation material,
   the thermal insulation material is disposed inside the first and second fuel channels on at least a surface facing the respective cathode electrode layer, and
   more of the thermal insulation material is disposed within the first fuel channel than in the second fuel channel.

8. The fuel cell stack according to claim 7, further comprising a third fuel channel positioned between a third two of the adjacent fuel cells, the third two of the adjacent fuel cells located inward of the second two of the adjacent fuel cells,
   wherein more of the thermal insulation material is disposed within the second fuel channel than in the third fuel channel.

9. The fuel cell stack according to claim 7, wherein a center fuel channel of the plurality of fuel cells in the stacking direction does not include the insulation material.

10. The fuel cell stack according to claim 1, wherein
    the first two of adjacent fuel cell is located at an upper edge or a lower edge of the fuel cell stack in a stacking direction,
    the heat balance adjusting means comprises a reforming catalyst and a thermal insulation material,
    the thermal insulation material is disposed on at least a surface of the first fuel channel facing the respective cathode electrode layer, and
    the reforming catalyst is disposed on at least one of an inner circumferential surface of the first fuel channel or the thermal insulation material disposed on a surface of the first fuel channel.

11. The fuel cell stack according to claim 1, wherein
    the first two of adjacent fuel cell is located at an upper edge or a lower edge of the fuel cell stack in a stacking direction,
    the heat balance adjusting means comprises a reforming catalyst and a thermal insulation material,
    the thermal insulation material is disposed on at least a surface of the first and second fuel channels facing the respective cathode electrode layer,
    the reforming catalyst is disposed inside the first fuel channel on at least one of an inner circumferential surface of the first fuel channel or on the thermal insulation material on the surface of the first fuel channel,
    the reforming catalyst is disposed inside the second fuel channel on at least one of an inner circumferential surface of the second fuel channel or on the thermal insulation material on the surface of the second fuel channel, and
    more of at least one of the thermal insulation material and the reforming catalyst is disposed within the first fuel channel than the second fuel channel.

12. The fuel cell stack according to claim 11, wherein
the reforming catalyst is disposed on the anode electrode layer of a center fuel cell positioned at a center of the fuel cell stack in a stacking direction.

13. The fuel cell stack according to claim 1, wherein
the second fuel channel comprises a first reforming catalyst having a first thermal conductivity, and
the first fuel channel comprises a second reforming catalyst having a second thermal conductivity higher than the first thermal conductivity.

14. The fuel cell stack according to claim 1, wherein
the heat balance adjusting means comprises a reforming catalyst,
the first two of adjacent fuel cells is located at a lower edge of the fuel cell stack in a stacking direction, and
the reforming catalyst is disposed inside the first fuel channel.

15. The fuel cell stack according to claim 1, wherein
the first two of adjacent fuel cell is located at a lower edge of the fuel cell stack in a stacking direction,
the heat balance adjusting means comprises a thermal insulation material, and
the thermal insulation material is disposed on at least a surface of the first fuel channel facing the respective cathode electrode layer.

16. A fuel cell stack comprising:
a plurality of fuel cells stacked in a stacking direction, each fuel cell comprising an anode electrode layer, a cathode electrode layer, and a solid electrolyte layer sandwiched between the anode electrode layer and the cathode electrode layer;
a plurality of separators, each located between adjacent two of the fuel cells;
a plurality of fuel channels through which fuel passes, each fuel channel located between adjacent two of the fuel cells via the separator; and
a plurality of U-turn channels, each configured to connect one of the fuel channels to a respective one of the anode electrode layers,
wherein the plurality of fuel channels includes a first fuel channel located between a first two of adjacent fuel cells located at an edge of the fuel cell stack in the stacking direction, and a second fuel channel located between a second two of adjacent fuel cells located inward of the first two of adjacent fuel cells, and
wherein at least one of the plurality of fuel channels comprises a reforming catalyst disposed inside the fuel channels, with more of the reforming catalyst disposed within the first fuel channel than in the second fuel channel.

17. A fuel cell stack comprising:
a plurality of fuel cells stacked in a stacking direction, each fuel cell comprising an anode electrode layer, a cathode electrode layer, and a solid electrolyte layer sandwiched between the anode electrode layer and the cathode electrode layer;
a plurality of separators, each located between adjacent two of the fuel cells;
a plurality of fuel channels through which fuel passes, each fuel channel located between adjacent two of the fuel cells via the separator; and
a plurality of U-turn channels, each configured to connect one of the fuel channels to a respective one of the anode electrode layers,
wherein the plurality of fuel channels includes a first fuel channel located between a first two of adjacent fuel cells located at an edge of the fuel cell stack in the stacking direction, and a second fuel channel located between a second two of adjacent fuel cells located inward of the first two of adjacent fuel cells, and
wherein at least one of the plurality of fuel channels comprises an insulation material disposed inside the fuel channels on at least a surface facing the respective cathode electrode layer, with more of the insulation material disposed within the first fuel channel than in the second fuel channel.

* * * * *